(12) United States Patent
Yoshinaga

(10) Patent No.: US 10,747,775 B2
(45) Date of Patent: Aug. 18, 2020

(54) DATA CONVERSION DEVICE, SEARCH SYSTEM, AND METHOD

(71) Applicant: Renesas Electronics Corporation, Tokyo (JP)

(72) Inventor: Kenji Yoshinaga, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 658 days.

(21) Appl. No.: 15/630,230

(22) Filed: Jun. 22, 2017

(65) Prior Publication Data

US 2018/0046689 A1 Feb. 15, 2018

(30) Foreign Application Priority Data

Aug. 12, 2016 (JP) ................. 2016-158705

(51) Int. Cl.
| | | |
|---|---|---|
| *G06F 12/00* | (2006.01) | |
| *G06F 16/25* | (2019.01) | |
| *G06F 16/951* | (2019.01) | |
| *G06F 16/903* | (2019.01) | |

(52) U.S. Cl.
CPC ...... *G06F 16/258* (2019.01); *G06F 16/90344* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 6,711,661 B1* | 3/2004 | Zabarski | H04L 45/7453 707/999.006 |
| 7,656,716 B1 | 2/2010 | Srinivasan et al. | |
| 2011/0055130 A1* | 3/2011 | Kim | G06F 16/90344 706/18 |
| 2011/0185176 A1* | 7/2011 | Takahashi | H04L 63/0861 713/168 |

\* cited by examiner

*Primary Examiner* — Kevin Verbrugge
(74) *Attorney, Agent, or Firm* — McDermott Will & Amery LLP

(57) ABSTRACT

A technique is provided that reduces the number of used entries in a CAM required to store a rule.
A data conversion device generates entry data which is to be compared with a search key and is stored in an associative memory that can hold three or more values. The data conversion device includes a conversion circuit for extracting a plurality of character strings from an inputted rule in accordance with a regular expression based on the regular expression and converting first and second character strings included in the character strings, respectively, into first and second bit data different from each other, and an encode circuit that compares the first bit data and the second bit data for each bit and generates entry data where each mismatch bit among a plurality of bits included in the first bit data is converted into "Don't Care" value based on a comparison result.

12 Claims, 25 Drawing Sheets

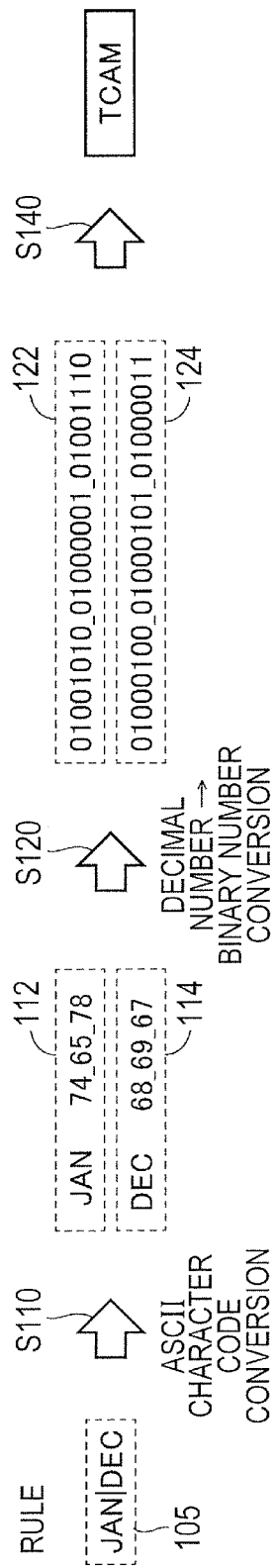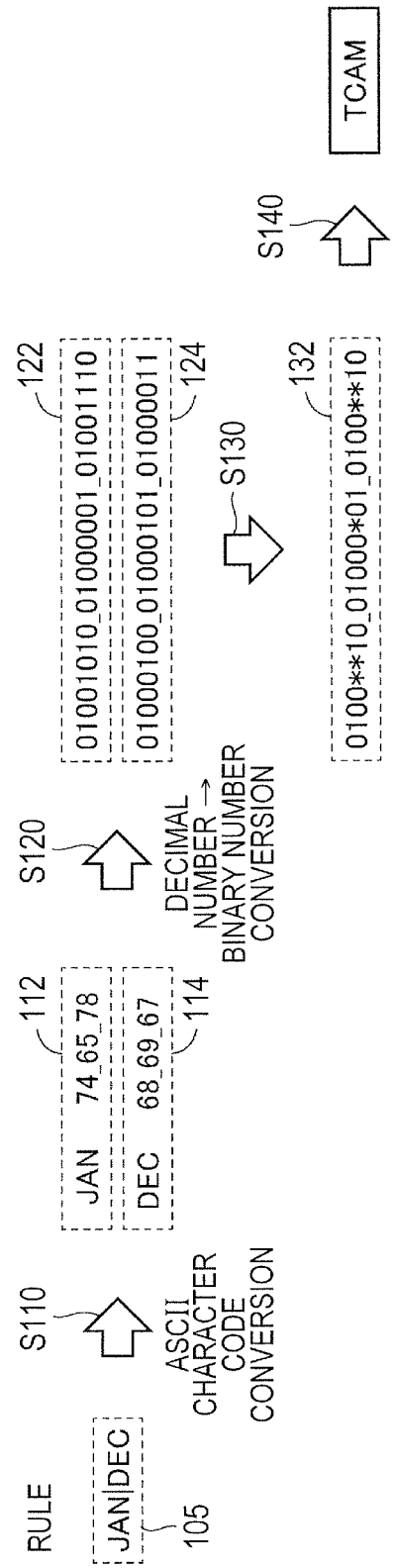

| SRAM CELL (X CELL) | SRAM CELL (Y CELL) | TCAM CELL DATA |
|---|---|---|
| "1" | "0" | "0" |
| "0" | "1" | "1" |
| "0" | "0" | "x" (don't care) |
| "1" | "1" | NON-USE |

FIG. 11
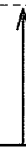
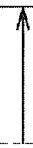
| | REGISTRATION CODE ~732 | | FIRST ENCODE CIRCUIT ~750 | | FIRST ENCODED DATA |
|---|---|---|---|---|---|
| JAN | 00000 | | | JAN | 00000000_00000000_00000000_00000000 |
| FEB | 00001 | | | FEB | 00000000_00000000_00000000_00000001 |
| MAR | 00010 | | | MAR | 00000000_00000000_00000000_00000011 |
| APR | 00011 | | | APR | 00000000_00000000_00000000_00000111 |
| MAY | 00100 | | | MAY | 00000000_00000000_00000000_00001111 |
| JUN | 00101 | | | JUN | 00000000_00000000_00000000_00011111 |
| JUL | 00110 | | | JUL | 00000000_00000000_00000000_00111111 |
| AUG | 00111 | | | AUG | 00000000_00000000_00000000_01111111 |
| SEP | 01000 | | | SEP | 00000000_00000000_00000000_11111111 |
| OCT | 01001 | | | OCT | 00000000_00000000_00000001_11111111 |
| NOV | 01010 | | | NOV | 00000000_00000000_00000011_11111111 |
| DEC | 01011 | | | DEC | 00000000_00000000_00000111_11111111 |
| | 01100 | | | | 00000000_00000000_00001111_11111111 |
| | 01101 | | | | 00000000_00000000_00011111_11111111 |
| | 01110 | | | | 00000000_00000000_00111111_11111111 |
| | 01111 | | | | 00000000_00000000_01111111_11111111 |
| | 10000 | | | | 00000000_00000000_11111111_11111111 |
| | 10001 | | | | 00000000_00000001_11111111_11111111 |
| | 10010 | | | | 00000000_00000011_11111111_11111111 |
| | 10011 | | | | 00000000_00000111_11111111_11111111 |
| | 10100 | | | | 00000000_00001111_11111111_11111111 |
| | 10101 | | | | 00000000_00011111_11111111_11111111 |
| | 10110 | | | | 00000000_00111111_11111111_11111111 |
| | 10111 | | | | 00000000_01111111_11111111_11111111 |
| | 11000 | | | | 00000000_11111111_11111111_11111111 |
| | 11001 | | | | 00000001_11111111_11111111_11111111 |
| | 11010 | | | | 00000011_11111111_11111111_11111111 |
| | 11011 | | | | 00000111_11111111_11111111_11111111 |
| | 11100 | | | | 00001111_11111111_11111111_11111111 |
| | 11101 | | | | 00011111_11111111_11111111_11111111 |
| | 11110 | | | | 00111111_11111111_11111111_11111111 |
| | 11111 | | | | 01111111_11111111_11111111_11111111 |
| | | | | | 11111111_11111111_11111111_11111111 |

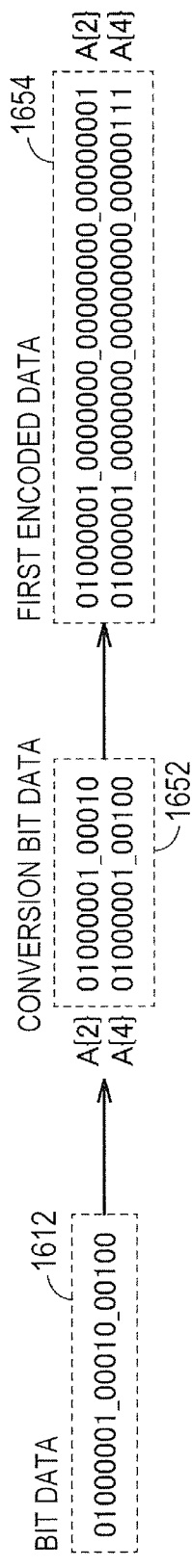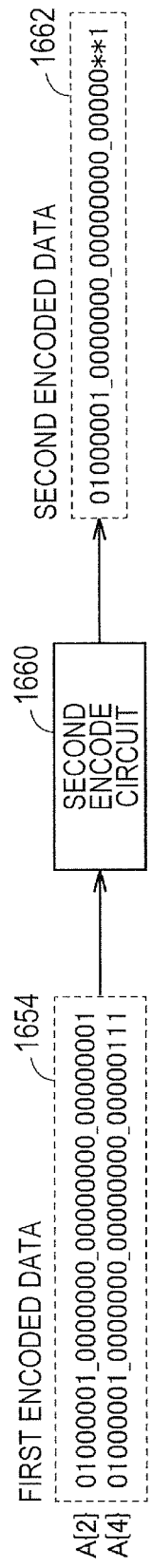

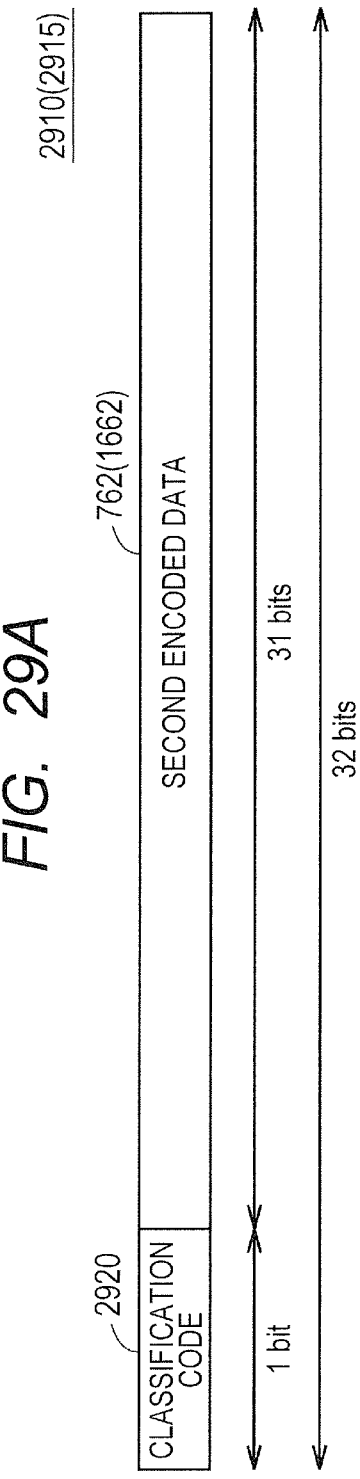
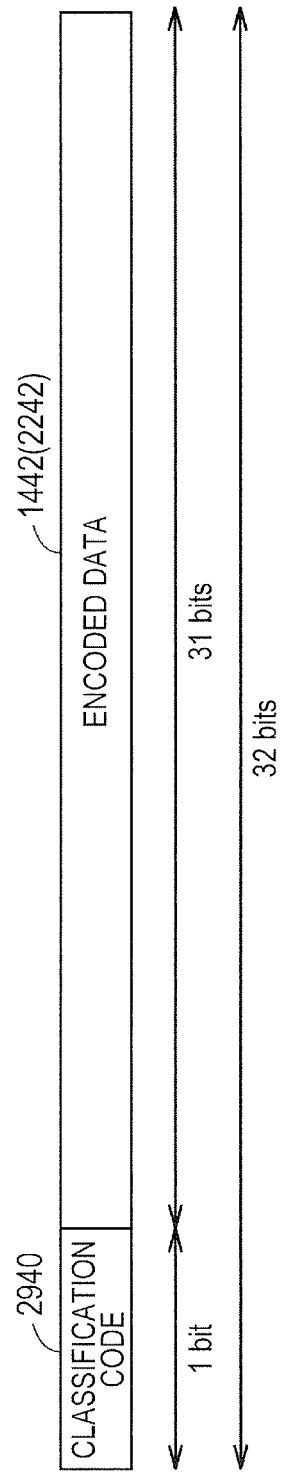
FIG. 29A
FIG. 29B

DATA CONVERSION DEVICE, SEARCH SYSTEM, AND METHOD

CROSS-REFERENCE TO RELATED APPLICATIONS

The disclosure of Japanese Patent Application No. 2016-158705 filed on Aug. 12, 2016 including the specification, drawings and abstract is incorporated herein by reference in its entirety.

BACKGROUND

The present disclosure relates to a technique for converting data, and more specifically to a technique for converting a rule (a match condition) into entry data to store the rule into an associative memory.

An associative memory (CAM: Content Addressable Memory) where a high-speed search operation can be performed is generally known. A search device using an associative memory is used for a router and a network switch, and an increase of the number of entries that store search data words (capacity enlargement of CAM) is required.

U.S. Pat. No. 7,656,716 (Patent Document 1) discloses a regular expression search engine that searches for a character string in accordance with a regular expression by using an associative memory. More specifically, the search engine is configured to determine a complexity level of an inputted regular expression and store the regular expression into one CAM device selected according to the complexity.

SUMMARY

In a technique disclosed in Patent Document 1, for example, when a rule (a match condition) in accordance with a regular expression of logical OR such as, for example, "ab(c|d)" is stored in TCAM (Ternary Content Addressable Memory), each of a, b, c, and d is stored in a different entry. Therefore, the technique has a problem that the number of used entries in a CAM required to store a rule is large.

The technique performs a character string search by switching PSM (Programmable Switch Matrixes: coupling switches) of PRS (Programmable interconnect Structure: local wiring band) according to a type of a regular expression included in a search condition. Therefore, the technique has a problem that a character string search logic such as the PRS, the PSM, and a latch circuit has to be added to a generic TCAM.

The present disclosure is made to solve the problems as described above and an object in an aspect is to provide a technique to reduce the number of used entries in a CAM required to store a rule (match condition).

A data conversion device according to an embodiment generates entry data which is to be compared with a search key and is stored in an associative memory that can hold three or more values. The data conversion device includes a conversion circuit for extracting a plurality of character strings from an inputted rule in accordance with a regular expression on the basis of the regular expression and converting first and second character strings included in the character strings, respectively, into first and second bit data different from each other, and an encode circuit that compares the first bit data and the second bit data for each bit and generates entry data in which each mismatch bit among a plurality of bits included in the first bit data is converted into a "Don't Care" value on the basis of a comparison result.

A data conversion device according to an embodiment can reduce the number of used entries in a CAM required to store a rule. Thereby, the CAM can store a larger number of rules (match conditions).

The above and other objects, features, aspects, and advantages of the present invention will become apparent from the detailed description below related to the present invention understood related to the accompanying drawings.

BRIEF DESCRIPTION OF THE DRAWINGS

FIGS. 1A and 1B are a diagram for explaining an overview of a data conversion device of a search condition (character string) according to an embodiment.

FIG. 11 is a diagram for explaining an operation of a first encode circuit according to the first embodiment.

FIG. 19 is a diagram for explaining an operation of a first encode circuit according to the third embodiment.

FIG. 20 is a diagram for explaining an operation of a second encode circuit according to the third embodiment.

FIGS. 29A and 29B are a diagram for explaining data structures of third encoded data and fourth encoded data according to the fifth embodiment.

DETAILED DESCRIPTION

Figure 2:
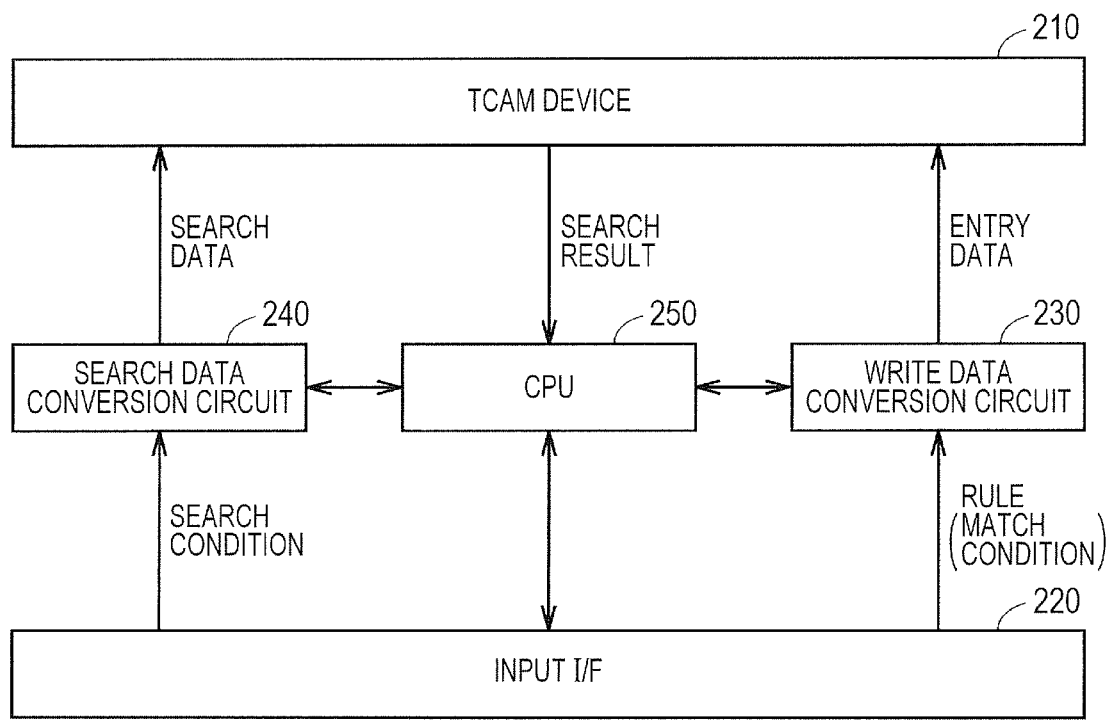
FIG. 2 is a diagram for explaining a configuration example of a search system according to a first embodiment.

Hereinafter, embodiments of the present invention will be described in detail with reference to the drawings. In the description below, the same components have the same reference numerals, and also have the same names and the same functions. Therefore, detailed description of the same components will not be repeated.

Technical Idea

FIG. 1 are a diagram for explaining an overview of a data conversion device according to an embodiment. A FIG. 1A is a diagram for explaining a data conversion device according to a related art. As an example, "JAN|DEC" including a regular expression of logical OR is defined as a rule 105 which is a match condition (Hit condition) to a search key.

In step S110, the data conversion device according to the related art extracts character strings "JAN" and "DEC" from the rule 105 based on a regular expression of logical OR. In step S110, the data conversion device converts the character strings to ASCII character codes 112 and 114, respectively.

In step S110, the data conversion device according to the related art converts the character codes 112 and 114 to binary bit data 122 and 124, respectively. In step S140, the data conversion device stores the bit data 122 and 124 into TCAM as entry data. Therefore, the data conversion device according to the related art stores two entry data into the TCAM with respect to a rule of logical OR including two character strings.

FIG. 1B is a diagram for explaining a data conversion device according to an embodiment. The data conversion device according to the embodiment further includes step S130 as compared with the data conversion device according to the related art.

In step S130, the data conversion device according to the embodiment compares the bit data 122 and the bit data 124 for each bit and converts each mismatch bit among bits included in either one of the bit data 122 and the bit data 124 into Don't Care "*". Don't Care "*" indicates that the bit may be "0" and "1". The data conversion device stores a converted encoded data 132 into the TCAM. Therefore, the data conversion device according to the embodiment stores one entry data into the TCAM with respect to a rule of logical OR including two character strings. The data conversion device according to the embodiment can reduce the number of entries of TCAM used to store a rule as compared with the data conversion device according to the related art. Hereinafter, configuration and control of the data conversion device will be described.

First Embodiment

FIG. 2 is a diagram for explaining a configuration example of a search system 200 according to a first embodiment. The search system 200 includes a TCAM device 210, an input I/F 220, a write data conversion circuit 230, a search data conversion circuit 240, and a CPU (Central Processing Unit) 250.

The TCAM device 210 includes a TCAM cell that can hold three or more values. A configuration of the TCAM device 210 including the TCAM cell will be described later with reference to FIGS. 3 to 6.

The input I/F 220 is a device for inputting information to the write data conversion circuit 230, the search data conversion circuit 240, and CPU 250. As an example, the input I/F 220 can be realized by devices such as a keyboard, a mouse, and a touch panel. A user can input a rule (a match condition) to be stored in the TCAM device 210 and a search condition through the input I/F 220.

The write data conversion circuit 230 converts an inputted rule in accordance with a regular expression into entry data to be stored in the TCAM device 210. The TCAM device 210 stores the converted entry data.

The search data conversion circuit 240 converts the inputted search condition into search data (search key) that can be searched by the TCAM device 210. The TCAM device 210 compares the search data and the entry data for each bit and outputs a search result to the CPU 250.

The CPU 250 is electrically coupled with each of the TCAM device 210, the input I/F 220, the write data conversion circuit 230, and the search data conversion circuit 240. The CPU 250 controls operations of these devices.

(Configuration of TCAM Cell)

Figures 3, 4:
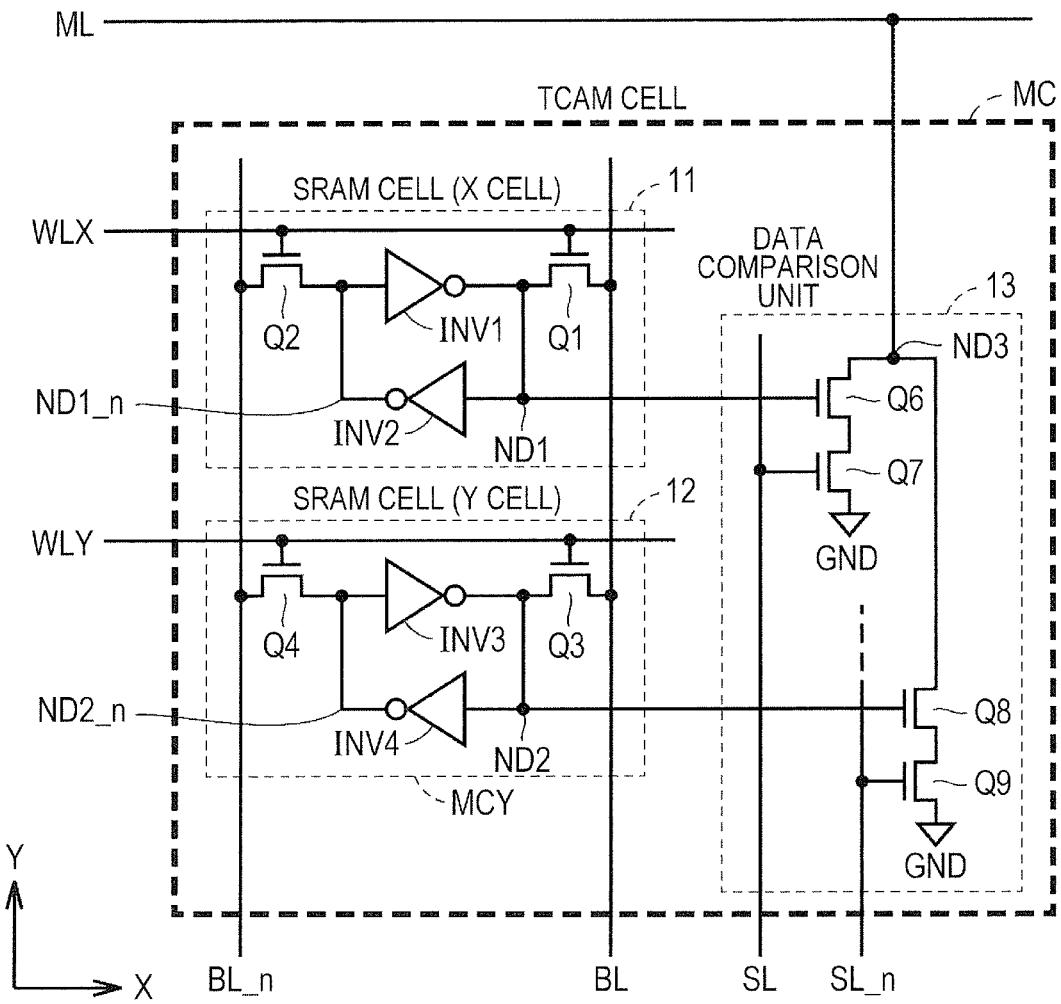
FIG. 3 is a diagram for explaining a configuration example of a TCAM cell included in a TCAM device according to the first embodiment.
FIG. 4 is a diagram showing a correspondence relationship between storage contents in an X cell and a Y cell and TCAM cell data in FIG. 3 in a tabular form.

FIG. 3 is a diagram for explaining a configuration example of the TCAM cell included in the TCAM device 210 according to the first embodiment. Referring to FIG. 3, the TCAM cell (also referred to as a memory cell MC) includes two SRAM cells (Static Random Access Memory Cells) 11 and 12 and a data comparison unit 13. The SRAM cell 11 is also referred to as an X cell and the SRAM cell 12 is also referred to as a Y cell. The X cell 11 stores mutually complementary data of one bit (when one bit is "1", the other bit is "0") into a pair of internal storage nodes ND1 and ND1_n. The Y cell 12 stores mutually complementary data of one bit into a pair of internal storage nodes ND2 and ND2_n.

The TCAM cell is coupled with a bit line pair BL and BL_n, a search line pair SL and SL_n, a match line ML, and a word lines WLX and WLY. The bit line pair BL and BL_n extends in a column direction (Y direction) of a TCAM cell array 20 in FIG. 5 and is shared by a plurality of TCAM cells arranged in the column direction. The search line pair SL and SL_n extends in the column direction (Y direction) of the TCAM cell array 20 and is shared by the plurality of TCAM cells arranged in the column direction. The match line ML extends in a row direction (X direction) of the TCAM cell array 20 and is shared by a plurality of TCAM cells arranged in the row direction. The word lines MLX and WLY extend in the row direction (X direction) of the TCAM cell array 20 and are shared by the plurality of TCAM cells arranged in the row direction.

The X cell 11 includes inverters INV1 and INV2 and N-channel MOS (Metal Oxide Semiconductor) transistors Q1 and Q2. The inverter INV1 is coupled between the storage node ND1 and the storage node ND1_n so that a direction from the storage node ND1_n to the storage node ND1 is a forward direction. The inverter INV2 is coupled in parallel with the inverter INV1 and in a direction opposite to that of the inverter INV1. The MOS transistor Q1 is coupled between the storage node ND1 and the bit line BL. The MOS transistor Q2 is coupled between the storage node ND1_n and the bit line BL_n. The gates of the MOS transistors Q1 and Q2 are coupled with the word line WLX.

The Y cell 12 includes inverters INV3 and INV4 and MOS (Metal Oxide Semiconductor) transistors Q3 and Q4. The inverter INV3 is coupled between the storage node ND2 and the storage node ND2_n so that a direction from the storage node ND2_n to the storage node ND2 is a forward direction. The inverter INV4 is coupled in parallel with the inverter INV3 and in a direction opposite to that of the inverter INV3. The MOS transistor Q3 is coupled between the storage node ND2 and the bit line BL. The MOS transistor Q4 is coupled between the storage node ND2_n and the bit line BL_n. The gates of the MOS transistors Q3 and Q4 are coupled with the word line WLY.

The data comparison unit 13 includes N-channel MOS transistors Q6 to Q9. The MOS transistors Q6 and Q7 are serially coupled between a node ND3 that is a coupling point with the match line ML and a ground node GND. The MOS transistors Q8 and Q9 are serially coupled between the node ND3 and the ground node GND and are also coupled in parallel with the entire MOS transistors Q6 and Q7 that are serially coupled. The gates of the MOS transistors Q6 and Q8 are coupled with the storage nodes ND1 and ND2, respectively. The gates of the MOS transistors Q7 and Q9 are coupled with the search lines SL and SL_n, respectively.

FIG. 4 is a diagram showing a correspondence relationship between storage contents in the X cell and the Y cell and TCAM cell data in FIG. 3 in a tabular form.

Referring to FIGS. 3 and 4, the TCAM cell can store three values "0", "1", and "*" (Don't Care) by using SRAM cells of two bits. Specifically, it is assumed that when "1" is stored in the storage node ND1 of the X cell 11 and "0" is stored in the storage node ND2 of the Y cell 12, "0" is stored in the TCAM cell. It is assumed that when "0" is stored in the storage node ND1 of the X cell 11 and "1" is stored in the storage node ND2 of the Y cell 12, "1" is stored in the TCAM cell. It is assumed that when "0" is stored in the storage node ND1 of the X cell 11 and "0" is stored in the storage node ND2 of the Y cell 12, "*" (Don't Care) is stored in the TCAM cell. When "1" is stored in the storage node ND1 of the X cell 11 and "1" is stored in the storage node ND2 of the Y cell 12, the TCAM cell is not used.

According to the configuration of the TCAM cell described above, when the search data is "1" (that is, the search line SL is "1" and the search line SL_n is "0") and TCAM data is "0" (that is, the storage node ND1 is "1" and the storage node ND2 is "0"), the MOS transistors Q6 and Q7 become an ON state, so that a potential of the pre-charged match line ML is pulled down to a ground potential. When the search data is "0" (that is, the search line SL is "0" and the search line SL_n is "1") and the TCAM data is "1" (that is, the storage node ND1 is "0" and the storage node ND2 is "1"), the MOS transistors Q8 and Q9 become an ON state, so that the potential of the pre-charged match line ML is pulled down to the ground potential. In short, when the search data and the TCAM data do not match each other, the potential of the match line ML is pulled down to the ground potential.

On the other hand, when the inputted search data is "1" and the TCAM data is "1" or "*" or when the search data is "0" and the TCAM data is "0" or "*" (that is, when the search data and the TCAM data match each other), the potential of the pre-charged match line ML (power supply potential VDD level) is maintained.

As described above, in the TCAM cell, a charge accumulated in the match line ML is pulled down unless data of all the TCAM cells coupled to the match line ML corresponding to one entry (row) match the inputted search data.

(Configuration of Subarray)

Figure 5:
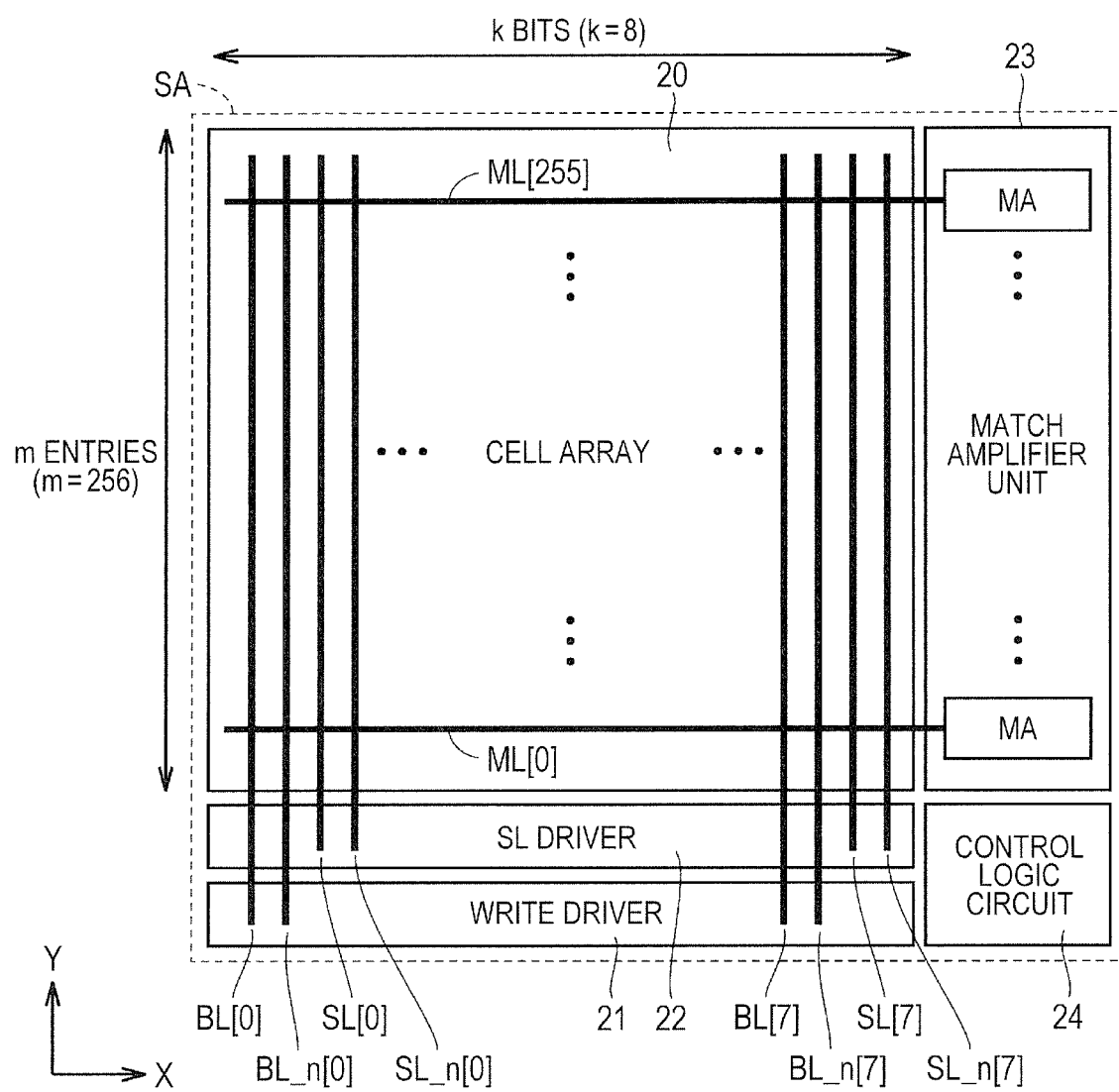
FIG. 5 is a diagram showing a configuration of one subarray included in the TCAM device.

FIG. 5 is a diagram showing a configuration of one subarray included in the TCAM device 210. Referring to FIG. 5, the subarray SA includes a TCAM cell array 20 (also referred to as a cell array), a write driver 21, a search line (SL) driver 22, a match amplifier unit 23, and a control logic circuit 24. The subarray SA further includes a word line driver (not shown in the drawings) for driving the word lines WLX and WLY in FIG. 3.

The cell array 20 includes TCAM cells arranged in a matrix form (m rows and k columns). In an example shown in FIG. 5, in the cell array 20, the number of rows (the number of entries) is 256 and the number of columns (the number of bits) is 8.

Corresponding to each column of the cell array 20, k (k=8) bit line pairs (from BL[0] and BL_n[0] to BL[k−1] and BL_n[k−1]) and k (k=8) search line pairs (from SL[0] and SL_n[0] to SL[k−1] and SL_n[k−1]) are provided. Corresponding to each row of the cell array 20, m (k=256) match lines (from ML[0] to ML[m−1]), m X cell word lines (from WLX[0] to WLX[m−1]) not shown in the drawings, and m Y cell word lines (from WLY[0] to WLY[m−1]) not shown in the drawings are provided.

The write driver 21 supplies write data to each TCAM cell through the bit line pair BL and BL_n during writing. The search driver 22 supplies search data to each TCAM cell through the search line pair SL and SL_n during searching. The control logic circuit 24 controls an operation of the entire subarray SA. For example, the control logic circuit 24 controls operations of the search line driver 22, the match amplifier unit 23, and a pre-charge circuit by receiving a search command and outputting a control signal to the search line driver 22 and the match amplifier unit 23 during searching.

The match amplifier unit 23 includes a plurality of match amplifiers MA respectively corresponding to the rows of the cell array. The match amplifier MA detects whether or not a corresponding TCAM cell data matches a corresponding portion of the inputted search data based on a potential of a corresponding match line ML during searching. In the present embodiment, the match amplifier MA includes a pre-charge circuit for pre-charging the corresponding match line ML during searching.

(Configuration of TCAM Device 210)

Figure 6:
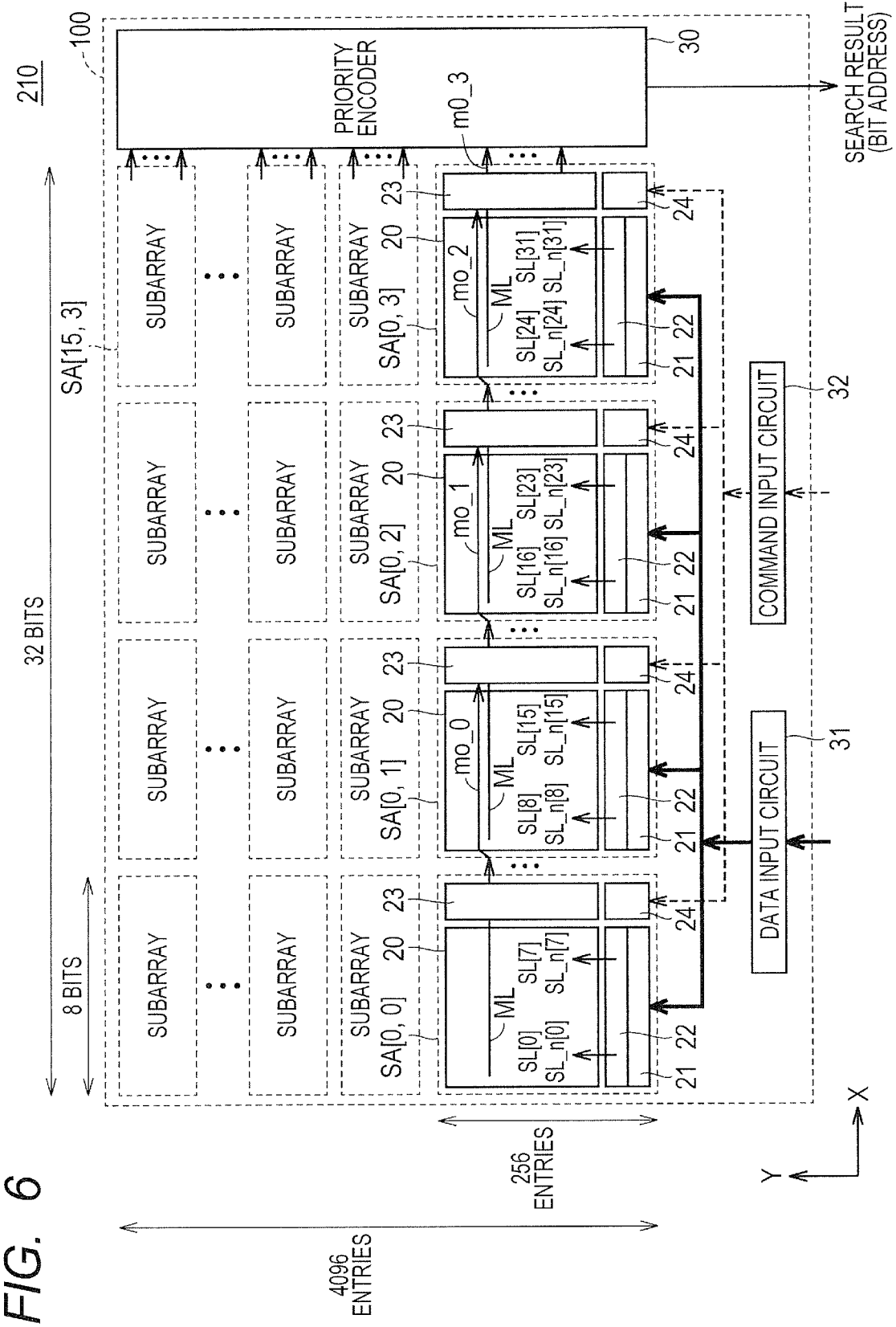
FIG. 6 is a block diagram showing a configuration of the TCAM device.

FIG. 6 is a block diagram showing a configuration of the TCAM device 210. Referring to FIG. 6, the TCAM device 210 includes a plurality of subarrays SA arranged in a matrix form, a priority encoder 30, a data input circuit 31, and a command input circuit 32.

In an example shown in FIG. 6, regarding a search table size realized by the TCAM device 210, a bit length of one entry (one row) is 32 bits and a total number of entries is 4096. The TCAM device 210 is divided into subarrays SA[0, 0] to SA[15, 3] of 16 rows and 4 columns. Regarding the size of each subarray SA, a total number of entries is 256 and a bit length of one entry is eight bits. These numbers are an example, and the configuration of the TCAM device 210 is not limited to that described above.

The search line pair SL and SL_n, the bit line pair BL and BL_n, the match line ML, and the word lines described above are arranged for each subarray. For example, search line pairs from search line pairs SL[0] and SL_n[0] to search line pairs SL[7] and SL_n[7] are provided to the subarray SA[0, 0]. Search line pairs from search line pairs SL[8] and SL_n[8] to search line pairs SL[15] and SL_n[15] are provided to the subarray SA[0, 1]. Search line pairs from search line pairs SL[16] and SL_n[16] to search line pairs SL [23] and SL_n[23] are provided to the subarray SA[0, 2]. Search line pairs from search line pairs SL[24] and SL_n [24] to search line pairs SL[31] and SL_n[31] are provided to the subarray SA[0, 3].

In FIG. 6, the match line ML is divided into four parts, each of which has eight bits, with respect to the entire search data of one entry and the entire TCAM cell data (write data) of one entry. Therefore, an AND gate (not shown in the drawings) for calculating a logical AND of a detection result of each match amplifier MA is provided to the match amplifier unit 23 for each row.

When data is written, the data input circuit 31 receives entry data from the write data conversion circuit 230 and outputs the received written data to the write driver 21 of a corresponding subarray SA. When data is searched, the data input circuit 31 receives search data from the search data conversion circuit 240 and outputs the received search data to the search line driver 22 of a corresponding subarray SA.

The command input circuit 32 receives various commands such as a write command and a search command from the CPU 250 and outputs the received commands to the control logic circuit 24 of a corresponding subarray SA.

The priority encoder 30 receives a search result (indicating whether or not the inputted search data matches the TCAM data) for each entry from adjacent subarrays SA[0, 3], SA[1, 3], . . . , and SA[15, 3]. When a plurality of entries are hit (matched), the priority encoder 30 outputs an address of a high-priority hit entry. The TCAM device 210 operates as described above. Next, a configuration of the write data conversion circuit 230 will be described with reference to FIGS. 7 to 13.

(Configuration and Control of Write Data Conversion Circuit 230)

Figure 7:
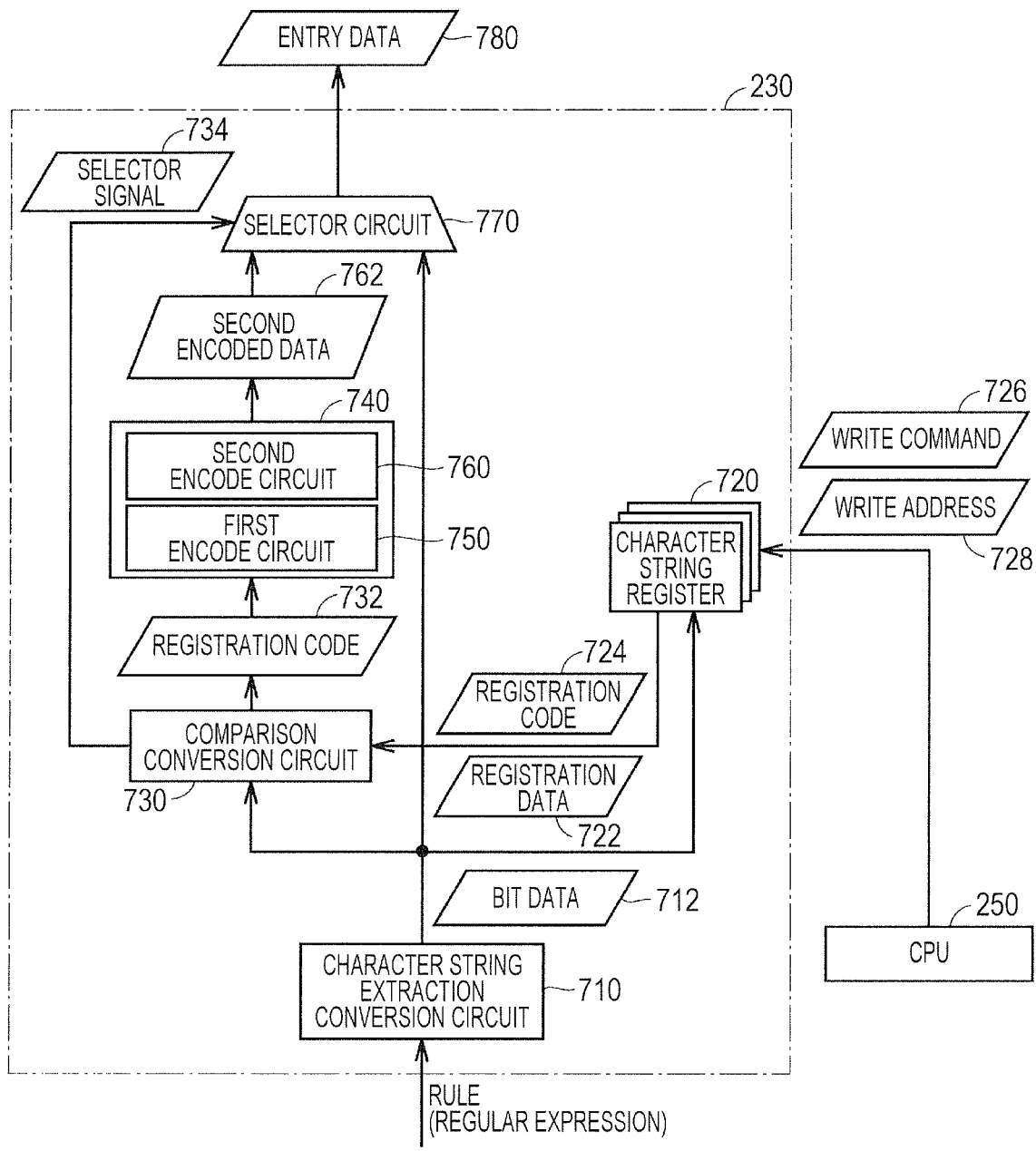
FIG. 7 is a diagram for explaining a configuration example of a write data conversion circuit according to the first embodiment.

FIG. 7 is a diagram for explaining a configuration example of the write data conversion circuit 230 according to the first embodiment. Referring to FIG. 7, the write data conversion circuit 230 includes a character string extraction conversion circuit 710, a character string register 720, a comparison conversion circuit 730, an encode circuit 740, and a selector circuit 770. The encode circuit 740 includes a first encode circuit 750 and a second encode circuit 760. As an example, an operation of each device when a rule including a regular expression of logical OR "JAN|FEB|MAR|APR|MAY|JUN|JUL|AUG|SEP|OCT|NOV|DEC" is inputted into the character string extraction conversion circuit 710 will be described with reference to FIGS. 8 to 13.

Figure 8:
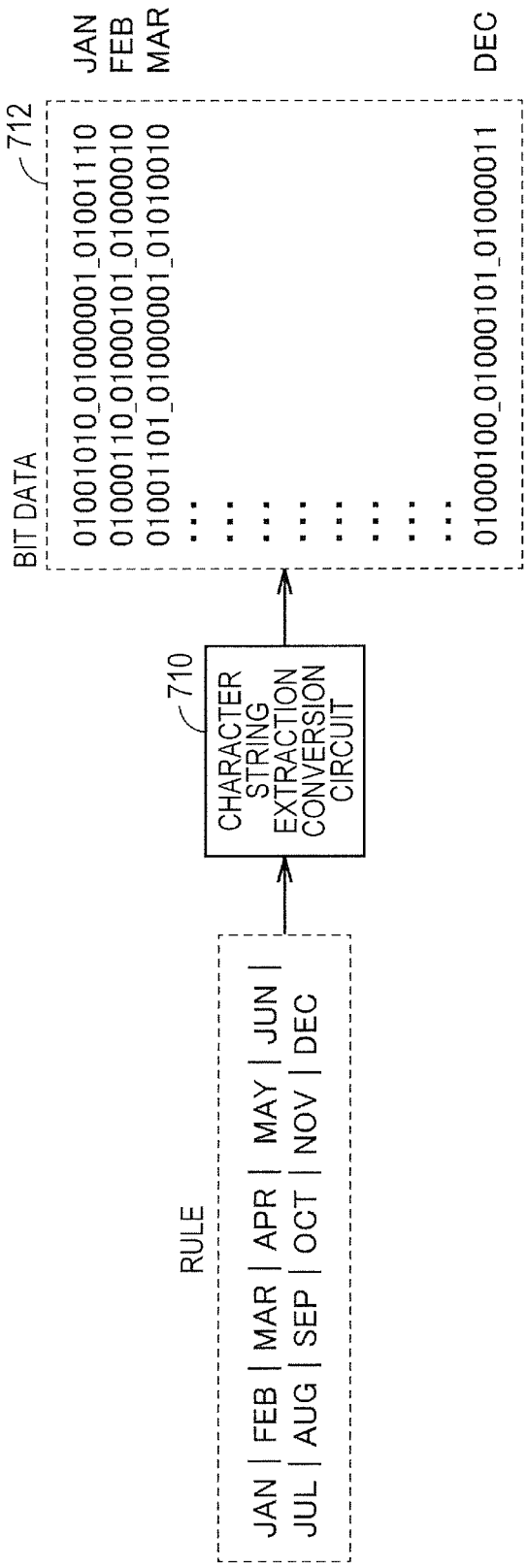
FIG. 8 is a diagram for explaining an operation of a character string extraction conversion circuit according to the first embodiment.

FIG. 8 is a diagram for explaining an operation of the character string extraction conversion circuit 710 according to the first embodiment. Referring to FIGS. 7 and 8, a rule (a match condition) in accordance with a regular expression is inputted into the character string extraction conversion circuit 710 through the input I/F 220. The character string extraction conversion circuit 710 extracts a character string from the rule and converts the extracted rule into a bit data 712. The character string extraction conversion circuit 710 outputs the converted bit data 712 to the character string register 720, the comparison conversion circuit 730, and the selector circuit 770.

In the present example, the character string extraction conversion circuit 710 extracts a plurality of character strings "JAN", "FEB", "MAR", "APR", "MAY", "JUN", "JUL", "AUG", "SEP", "OCT", "NOV", and "DEC" from the inputted rule based on a regular expression (logical OR) included in the rule.

The character string extraction conversion circuit 710 converts the character strings into binary ASCII character codes and generates bit data 712.

Figure 9:
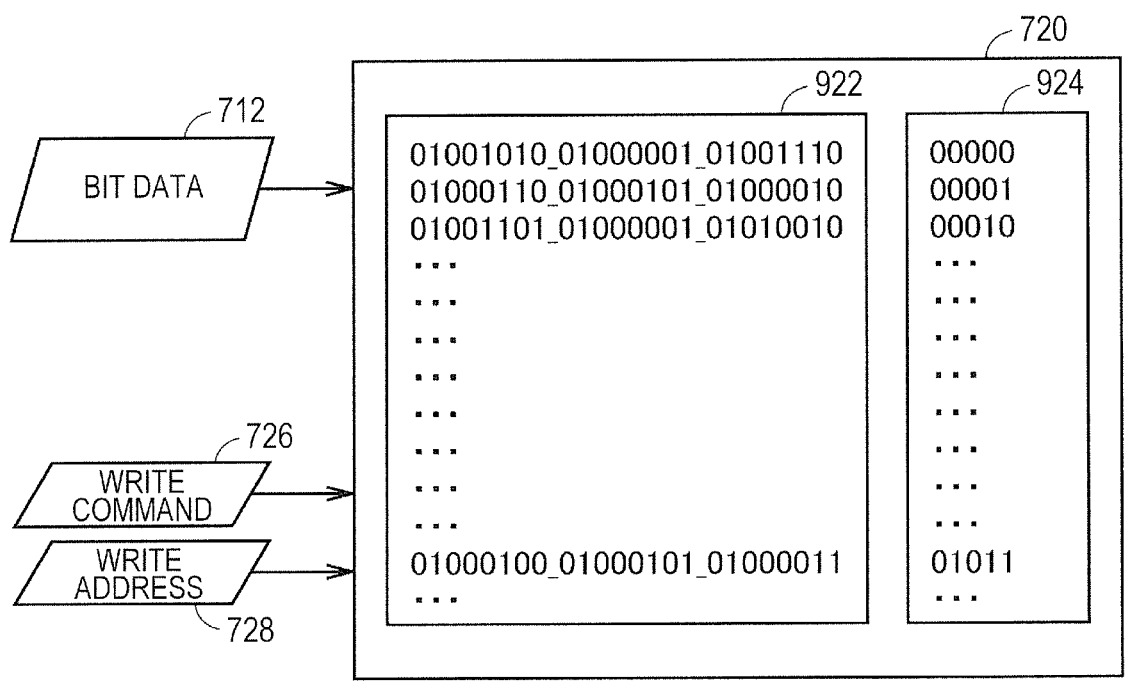
FIG. 9 is a diagram for explaining an operation of a character string register according to the first embodiment.

FIG. 9 is a diagram for explaining control of registering data in the character string register 720 according to the first embodiment. The character string register 720 includes a registration data register 922 and a registration code register 924. The registration code register functions as an address.

Referring to FIGS. 7 and 9, the character string extraction conversion circuit 710 stores the converted bit data 712 into the registration data register 922. The CPU 250 controls a write command 726 and thereby registers a character string (bit data representing a character string) to be encoded by the encode circuit 740 described later into the character string register 720. As an example, when the write command 726 inputted from the CPU 250 is "1", the character string register 720 stores the bit data 712 into the registration data register 922 according to a write address 728. At this time, the CPU 250 outputs the write address 728 so that the bit data 712 is stored in a continuous registration code (address). In an example of FIG. 9, the bit data 712 corresponding to the first character string "JAN" included in the rule "JAN|FEB| . . . |DEC" is stored in an address "00000" of the registration code register 924. The bit data 712 corresponding to the character string "FEB" following the character string "JAN" is stored in an address "00001" of the registration code register 924.

The character string register 720 stores a plurality of registration data 722 stored in each address of the registration data register 922 and a plurality of registration codes 724 stored in the registration code register 924 in association with each other.

Figure 10:
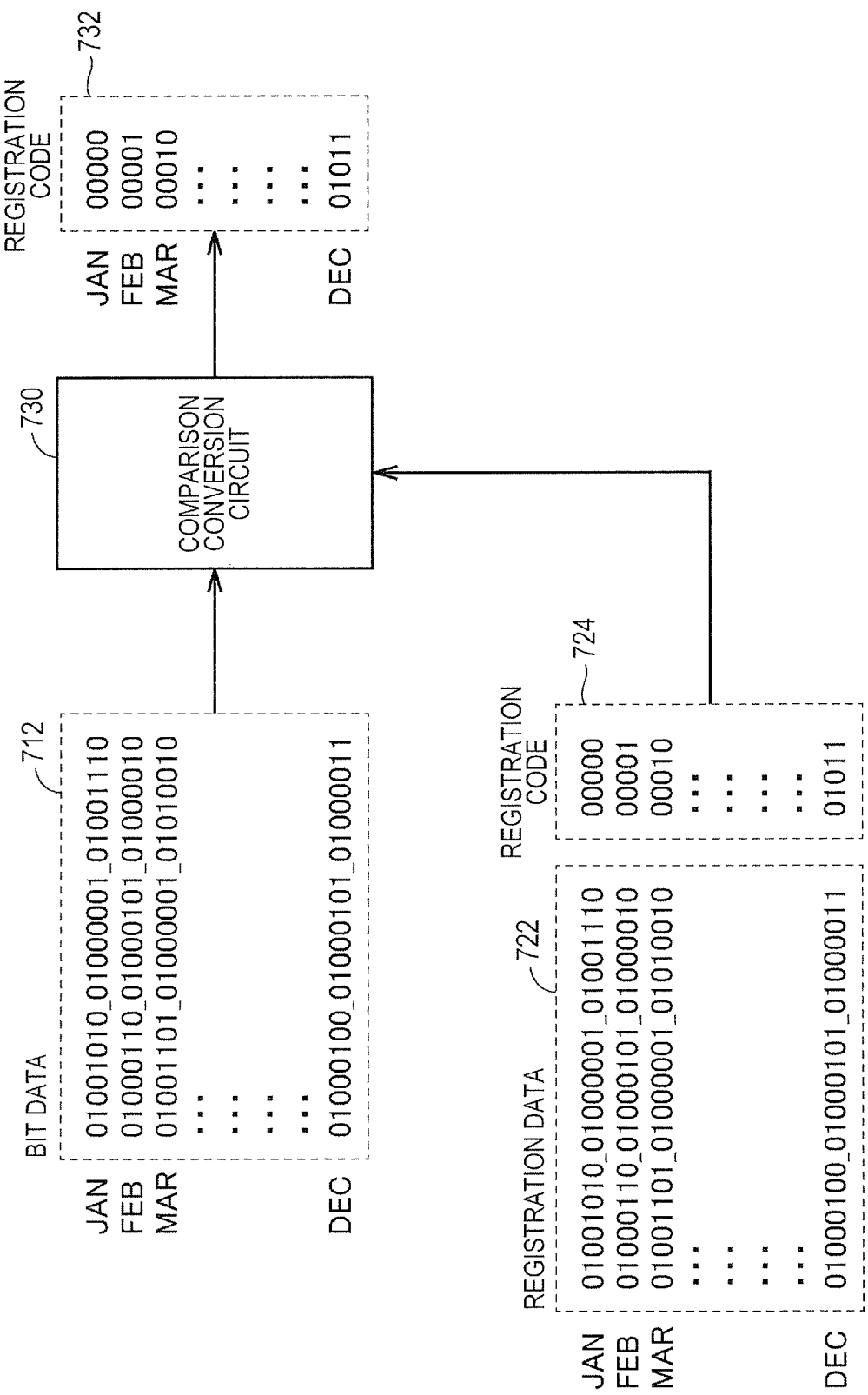
FIG. 10 is a diagram for explaining an operation of a comparison conversion circuit according to the first embodiment.

FIG. 10 is a diagram for explaining an operation of the comparison conversion circuit 730 according to the first embodiment. Referring to FIGS. 7 and 10, the comparison conversion circuit 730 converts the bit data 712 inputted from the character string extraction conversion circuit 710 into a registration code 732 and outputs the registration code 732 to the encode circuit 740. Further, the comparison conversion circuit 730 compares the bit data 712 and a plurality of registration data 722 and outputs a selector signal 734 indicating a comparison result to the selector circuit 770.

The comparison conversion circuit 730 compares the bit data 712 inputted from the character string extraction conversion circuit 710 and a plurality of registration data 722 inputted from the character string register 720. When the bit data 712 matches any one of the plurality of registration data 722, the comparison conversion circuit 730 outputs a registration code 724 (732) associated with the matched registration data 722 to the encode circuit 740.

In the present example, it is assumed that bit data corresponding to character strings "JAN", "FEB", . . . , and "DEC" are stored in the registration data register 922. In this case, the comparison conversion circuit 730 determines that each of the bit data 712 corresponding to the character strings matches anyone of the plurality of registration data 722. Thereby, the comparison conversion circuit 730 outputs registration codes 724 "00000", "00001", ..., and "01011" that are associated with the matched registration data 722 to the encode circuit 740 as the registration codes 732. Further, the comparison conversion circuit 730 outputs the selector signal 734 indicating a comparison result (match) between the inputted bit data 712 and the plurality of registration data 722 to the selector circuit 770. As described in FIG. 9, the registration codes 724 associated with the matched registration data 722 are continuous numbers (binary numbers).

In another aspect, if bit data 712 corresponding to a character string "SUN" is inputted, the comparison conversion circuit 730 determines that there is no registration data 722 that matches the bit data 712 and does not output the registration code 732. The comparison conversion circuit 730 outputs the selector signal 734 indicating a comparison result (mismatch) between the inputted bit data 712 and the plurality of registration data 722 to the selector circuit 770.

FIG. 11 is a diagram for explaining an operation of the first encode circuit 750 according to the first embodiment. The first encode circuit 750 encodes the registration code 732 inputted from the comparison conversion circuit 730 according to a predetermined method.

In an example shown in FIG. 11, the first encode circuit 750 generates encoded data so that "1" is sequentially set from the least significant bit according to a number (binary number) indicated by the registration code. As an example, the encoded data consists of 31 bits. For example, the first encode circuit 750 encodes a registration code "00011" (3 in decimal number) corresponding to the character string "APR" into "0000000_00000000_00000000_00000111". In another aspect, the first encode circuit 750 may encode a registration code according to another method (for example, one hot encoding).

The first encode circuit 750 encodes registration codes of a minimum value and a maximum value of a plurality of inputted registration codes 732. In the present example, registration codes "00000", "00001", ..., and "01011" that are associated with the character strings "JAN", "FEB", ..., and "DEC" are inputted into the first encode circuit 750. Accordingly, the first encode circuit 750 outputs two first encoded data 752 obtained by encoding the minimum value "00000" and the maximum value "01011" to the second encode circuit 760.

At this time, the two first encoded data "0000000_00000000_00000000_00000000" and "0000000_00000000_00000111_11111111" include bit data in common (hereinafter also referred to as common bit data) from the most significant bit to the 20th bit. The common bit data functions as bit data that indicates a category in common with a plurality of character strings included in a rule. When the rule "JAN|FEB| . . . |DEC" is inputted into the character string extraction conversion circuit 710, the common bit data indicates a "month" in common with a plurality of character strings included in the rule.

Figure 12:
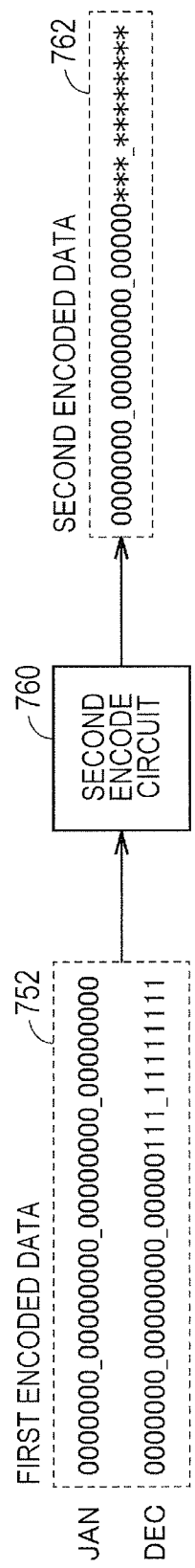
FIG. 12 is a diagram for explaining an operation of a second encode circuit according to the first embodiment.

FIG. 12 is a diagram for explaining an operation of the second encode circuit 760 according to the first embodiment. Referring to FIGS. 7 and 12, the second encode circuit 760 compares the two first encoded data 752 inputted from the first encode circuit 750 and generates second encoded data 762. More specifically, the second encode circuit 760 compares one first encoded data 752 with the other first encoded data 752 for each bit and converts each mismatch bit into Don't Care "*". The second encode circuit 760 outputs the generated second encoded data 762 to the selector circuit 770.

In the present example, the first encoded data "0000000_00000000_00000000_00000000" and "0000000_00000000_00000111_11111111" are inputted into the second encode circuit 760. In this case, the second encode circuit 760 determines that the least significant 11 bits of the two first encoded data do not match and generates the second encoded data 762 "0000000_00000000_00000*_******".

Figure 13:
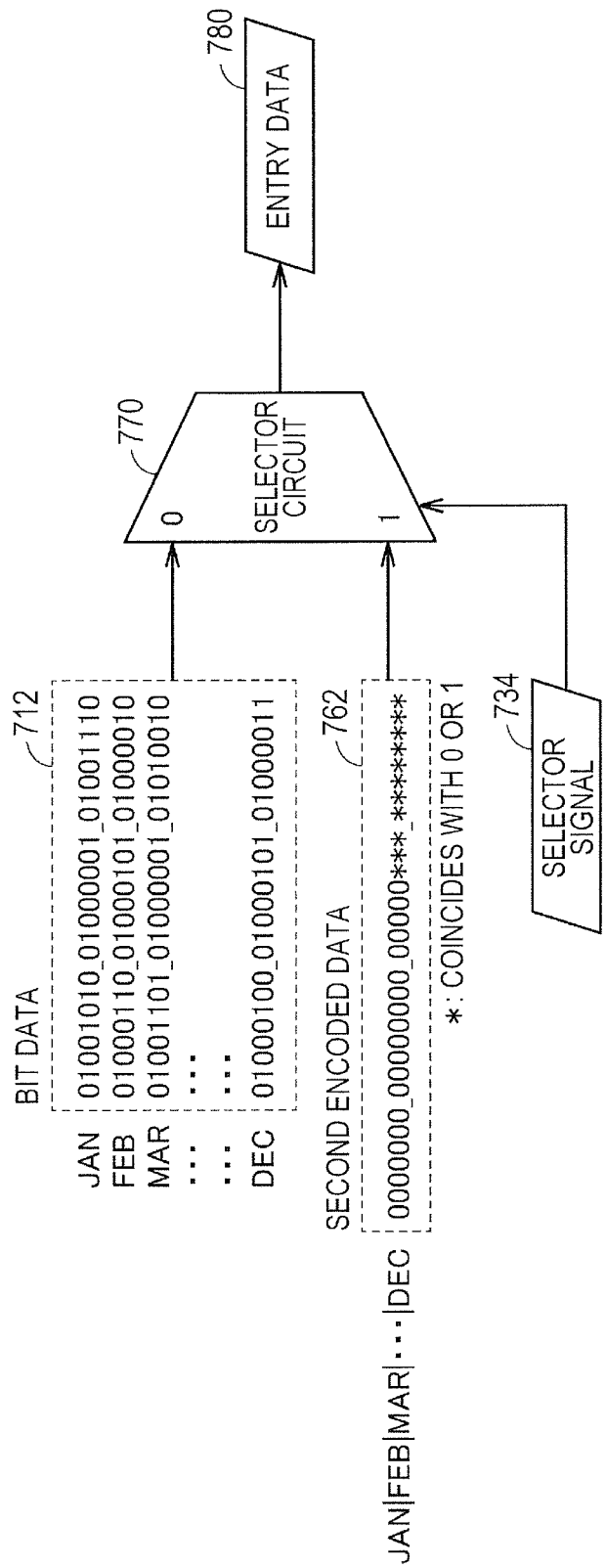
FIG. 13 is a diagram for explaining an operation of a selector circuit according to the first embodiment.

FIG. 13 is a diagram for explaining an operation of the selector circuit 770 according to the first embodiment. Referring to FIGS. 7 and 13, the selector circuit 770 outputs either one of the bit data 712 and the second encoded data 762 according to the selector signal 734. In the first embodiment, when the comparison conversion circuit 730 determines that the inputted bit data 712 matches any one of the plurality of registration data 722, the comparison conversion circuit 730 outputs the selector signal 734 of "1" to the selector circuit 770. When the inputted bit data 712 matches none of the plurality of registration data 722, the comparison conversion circuit 730 outputs the selector signal 734 of "0" to the selector circuit 770. When the selector signal 734 of "1" is inputted into the selector circuit 770, the selector circuit 770 outputs the second encoded data 762 to the TCAM device 210 as entry data 780. On the other hand, when the selector signal 734 of "0" is inputted into the selector circuit 770, the selector circuit 770 outputs the bit data 712 to the TCAM device 210 as entry data 780.

The TCAM device 210 stores the entry data 780 into a TCAM cell that constitutes one entry. In the present example, while one entry of the TCAM device is 32 bits, the bit data 712 is 24 bits and the second encoded data 762 is 31 bits. Therefore, in a certain aspect, the TCAM device 210 adds eight bits of "*" to the bit data 712, adds one bit of "*" to the second encoded data 762, and stores the data into the TCAM cell that constitutes one entry. Thereby, the bit lengths of entry data stored into the TCAM device 210 become the same. Therefore, the TCAM device can compare an inputted search key and entry data without performing special processing on the inputted search key.

According to the above description, the write data conversion circuit 230 according to the first embodiment can reduce the number of entries of TCAM used to store a rule. For example, the write data conversion circuit 230 represents a rule including a regular expression of logical OR "JAN|FEB| . . . |DEC" as one entry data. Thereby, the TCAM device 210 can store a larger number of rules into a TCAM cell.

The write data conversion circuit 230 converts a plurality of character strings included in a rule including a regular expression of logical OR into a registration code of continuous numbers and generates two first encoded data 752 including bits of "1", the number of which corresponds to the minimum value and the maximum value of the registration code. Thereby, the write data conversion circuit 230 can generate the entry data 780 (the second encoded data 762) including all the character strings included in the rule. As described in FIG. 1, even when the minimum value and the maximum value of the registration code are not used, the write data conversion circuit 230 can represent at least two character strings as one entry data.

In addition, the write data conversion circuit 230 is a circuit independent from the TCAM device 210, so that the search system according to the first embodiment can use a generic TCAM as the TCAM device 210. Therefore, the search system can suppress the cost of TCAM.

In another aspect, the encode circuit 740 can encode three or more inputted registration codes into the first encoded data, compare one first encoded data with a plurality of the other first encoded data 752 for each bit, convert a bit that does not match that of any of the plurality of the other first encoded data 752 into "*" to generate the second encoded data.

For example, the encode circuit 740 can convert all of a plurality of inputted registration codes 732 "00000", "00001", . . . , and "01011" into the first encoded data 752. In this case, the encode circuit 740 can compare one first encoded data with a plurality of the other first encoded data 752 for each bit and generate the second encoded data 762 "0000000_00000000_00000*_****" in which a bit does not match that of any of the plurality of the other first encoded data 752** is converted into "*".

(Configuration and Control of Search Data Conversion Circuit 240)

Figure 14:
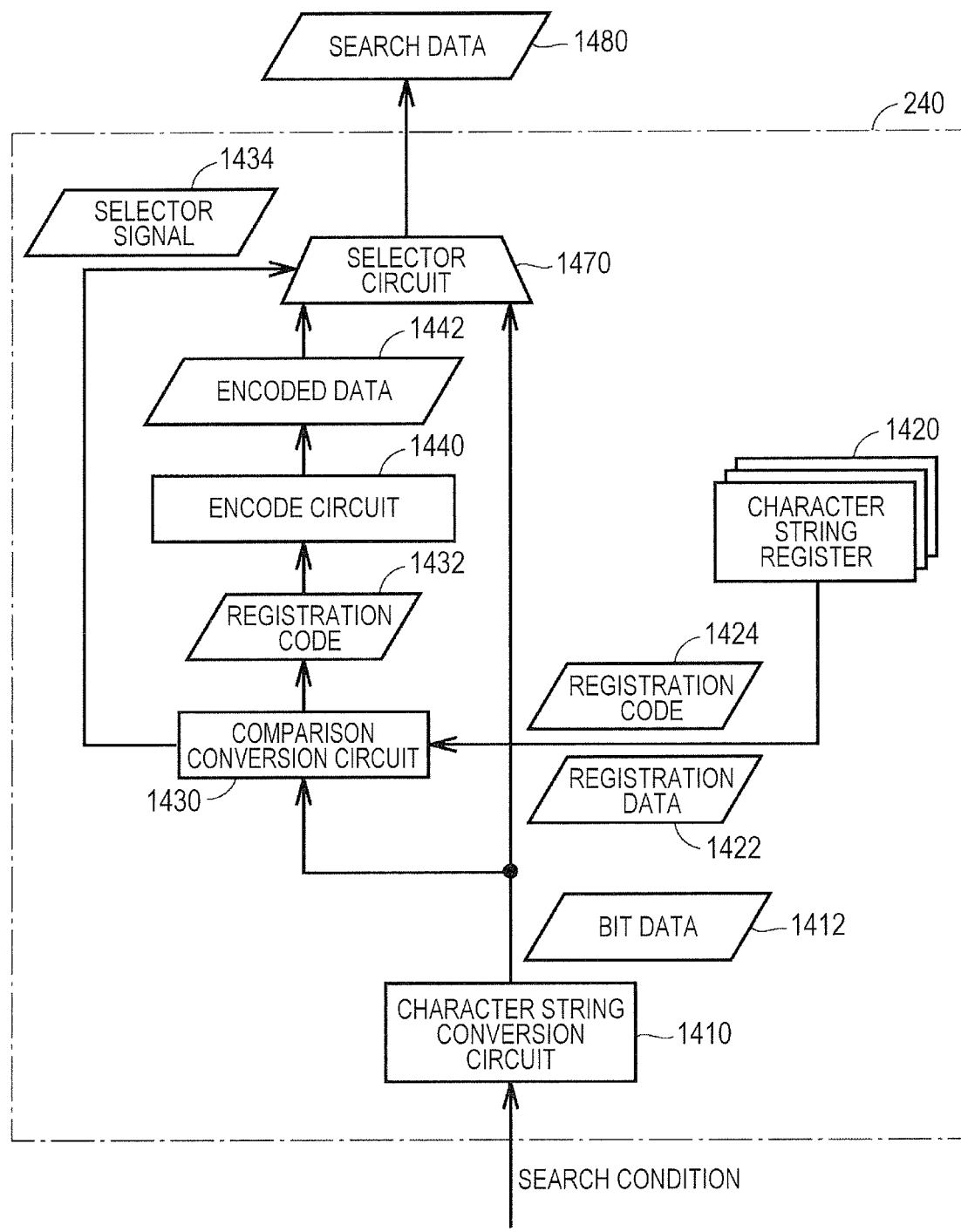
FIG. 14 is a diagram for explaining a configuration example of a search data conversion circuit according to the first embodiment.

FIG. 14 is a diagram for explaining a configuration example of the search data conversion circuit 240 according to the first embodiment. The search data conversion circuit 240 includes a character string conversion circuit 1410, a character string register 1420, a comparison conversion circuit 1430, an encode circuit 1440, and a selector circuit 1470. The character string conversion circuit 1410, the character string register 1420, the comparison conversion circuit 1430, the encode circuit 1440, and the selector circuit 1470 respectively perform substantially the same operations as those of the character string extraction conversion circuit 710, the character string register 720, the comparison conversion circuit 730, the first encode circuit 750, and the selector circuit 770 described in FIG. 7, so that detailed operations thereof will not be described again.

The character string conversion circuit 1410 converts a character string inputted as a search condition into binary bit data 1412 in the same manner as the character string extraction conversion circuit 710 and outputs the bit data 1412 to the comparison conversion circuit 1430 and the selector circuit 1470.

The character string register 1420 stores the same data as that stored in the character string register 720. In other words, registration data 1422 and registration code 1424 stored in the character string register 1420 are the same data as the registration data 722 and the registration code 724 stored in the character string register 720. The character string register 1420 stores the registration data 1422 and the registration code 1424 associated with the registration data 1422. In another aspect, the character string register 720 and the character string register 1420 may be the same register.

When the inputted bit data 1412 matches any one of a plurality of registration data 1422, the comparison conversion circuit 1430 outputs the registration code 1424 (1432) associated with the matched registration data 1422 to the encode circuit 1440.

Further, the comparison conversion circuit 1430 outputs a selector signal 1434 indicating whether or not the inputted bit data 1412 matches any one of a plurality of registration data 1422 to the selector circuit 1470.

The encode circuit 1440 encodes an inputted registration code 1432 according to the same method as an encode method performed by the first encode circuit 750. The encode circuit 1440 outputs encoded data 1442 generated by encoding the registration code 1432 to the selector circuit 1470.

When the selector signal 1434 indicating matching is inputted into the selector circuit 1470, the selector circuit 1470 outputs the encoded data 1442 to the TCAM device 210 as search data 1480. On the other hand, when the selector signal 1434 indicating mismatching is inputted into the selector circuit 1470, the selector circuit 1470 outputs the bit data 1412 to the TCAM device 210 as search data 1480.

The above operation will be described using a specific example. As an example, it is assumed that a character string "FEB" (search condition) is inputted into the character string conversion circuit 1410. It is assumed that the character string register 1420 stores the registration data 1422 corresponding to the character strings "JAN", "FEB", . . . , and "DEC" and the registration code 1424 associated with the data.

The character string conversion circuit 1410 converts the search condition "FEB" into a binary ASCII character code and obtains bit data "01000110_010000101_01000010". The comparison conversion circuit 1430 determines that there is registration data that matches the above bit data in a plurality of registration data 1422 and outputs a registration code "00001" associated with the registration data to the encode circuit 1440. Further, the comparison conversion circuit 1430 outputs the selector signal 1434 indicating matching to the selector circuit 1470.

The encode circuit 1440 encodes the registration code "00001" into "0000000_00000000_00000000_00000001" according to the encode method of the first encode circuit 750 shown in FIG. 11 and outputs the encoded data to the selector circuit 1470.

The selector circuit 1470 outputs encoded data "0000000_00000000_00000000_00000001" to the TCAM device 210 as the search data 1480 (search key) according to the selector signal 1434 indicating matching.

In the TCAM device 210, entry data "0000000_00000000_00000*_****" indicating that the search data is any one of "JAN", "FEB", . . . , and "DEC" is stored. Therefore, the TCAM device 210 outputs information indicating that the inputted search data "0000000_00000000_00000000_00000001" is hit and information of an address where the entry data is stored to the CPU 250** as a search result.

According to the above description, the search system 200 converts a rule including a plurality of character strings into entry data including common bit data and stores the entry data into a TCAM cell. Thereby, the search system 200 can reduce the number of entries of TCAM used to store a rule.

Further, the search system 200 generates search data so that a search condition (character string) that matches a character string that is registered in advance includes the above common bit data. Thereby, the search system 200 can determine (search) that a character string included in the search condition is included in a category indicated by the common bits by using a small number of entries. Thereby, for example, the search system 200 can determine a category to which the character string included in the search condition belongs by using a small number of entries. In a certain aspect, the search system 200 may display information related to a category to which the character string included in the search condition belongs on a display (not shown in the drawings).

Second Embodiment

The first encode circuit 750 of the first embodiment has a configuration to generate encoded data so that "1" is sequentially set from the least significant bit according to the magnitude of a number (binary number) indicated by the registration code. In this configuration, the bit length of the generated encoded data is 31 bits, so that the number of character strings that can be registered in the character string register 720 (and 1420) is 32.

A search system according to a second embodiment increases the number of character strings that can be registered in a character string register without changing the bit length of encoded data with respect to the system according to the first embodiment. Hereinafter, a configuration of the search system according to the second embodiment will be described. A basic configuration of the search system according to the second embodiment is substantially the same as that of the search system according to the first embodiment, and therefore only differences between them will be described.

Figure 15:
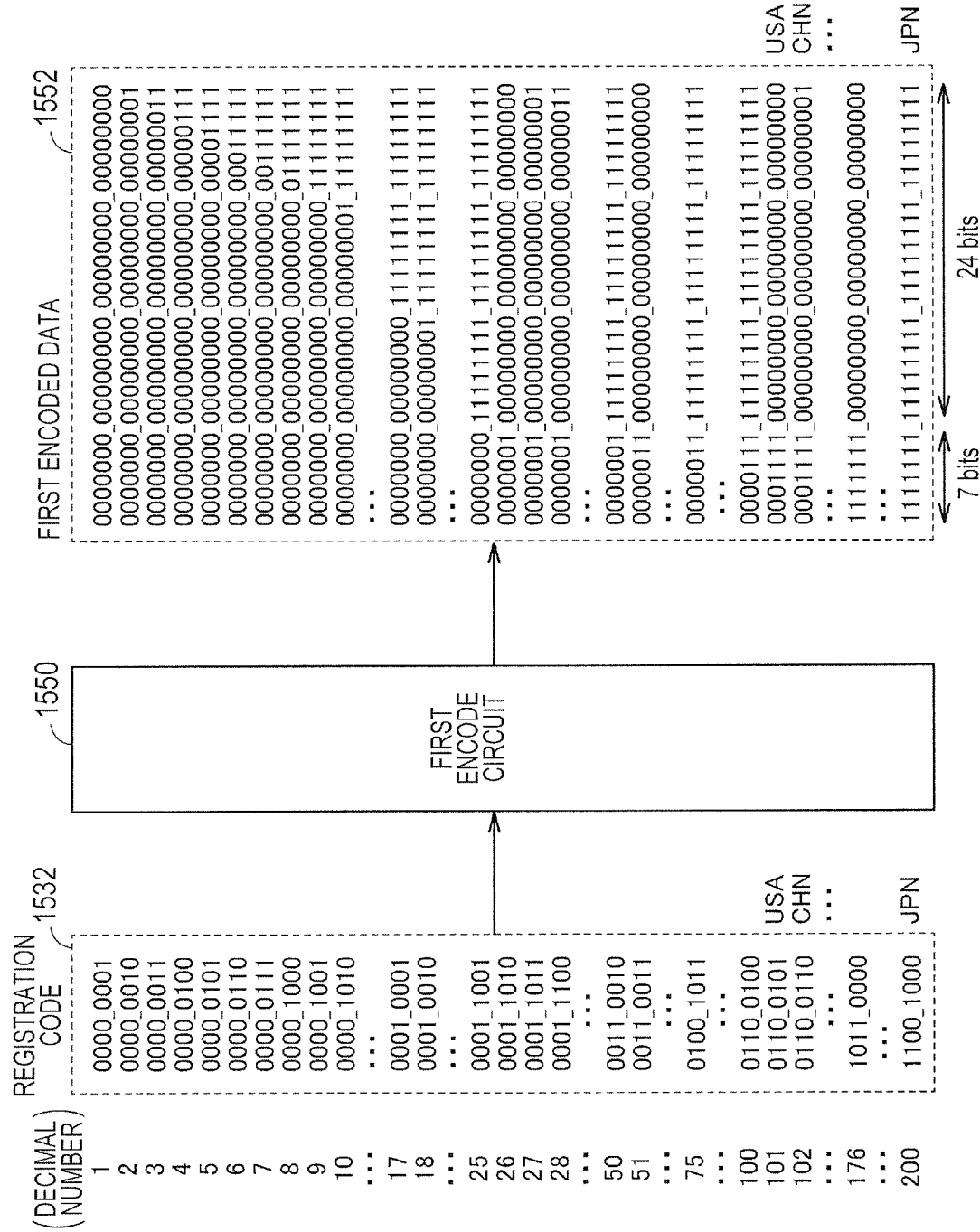
FIG. 15 is a diagram for explaining a first encode circuit according to a second embodiment.

FIG. 15 is a diagram for explaining a first encode circuit 1550 according to the second embodiment. The write data conversion circuit 230 according to the second embodiment includes the first encode circuit 1550 instead of the first encode circuit 750 according to the first embodiment.

The character string register according to the first embodiment stores a registration code of five bits. On the other hand, the character string registers 720 and 1420 according to the second embodiment store a registration code of eight bits. In other words, the character string registers according to the second embodiment store registration data in association with an address of eight bits.

In the same manner as the first encode circuit 750, the first encode circuit 1550 generates first encoded data 1552 so that "1" is sequentially set from the least significant bit according to the magnitude of a number (binary number) indicated by the registration code. In addition, the first encode circuit 1550 handles the most significant seven bits of the 31-bit encoded data as carry bits when all the least significant 24 bits become "1".

The above operation will be described using a specific example. The first encode circuit 1550 converts a registration code "0001_1001" (25 in decimal number) into the first encoded data 1552 where all the least significant 24 bits are "1". The first encode circuit 1550 converts the next registration code "0001_1010" (26 in decimal number) into the first encoded data 1552 where all the least significant 24 bits are "0" and the 25th bit is "1".

The first encode circuit 1550 converts a registration code "0011_0010" (50 in decimal number) into the first encoded data 1552 where all the least significant 24 bits are "1" and the 25th bit is "1". The first encode circuit 1550 converts the next registration code "0011_0011" (51 in decimal number) into the first encoded data 1552 where all the least significant 24 bits are "0" and the 25th and 26th bits are "1".

According to the above description, the first encode circuit 1550 according to the second embodiment can generate a maximum of 200 (=(7+1)×(24+1)) encoded data by handling the generated 31-bit first encoded data 1552 by dividing the first encoded data 1552 into upper 7 bits and lower 24 bits. In other words, the search system according to the second embodiment can increase the number of character strings that can be registered in the character string register without increasing the bit length of the first encoded data as compared with the system according to the first embodiment.

In the example described above, the first encoded data 1552 is divided into upper 7 bits and lower 24 bits. However, in another aspect, the division ratio is arbitrarily set. As an example, when the first encoded data 1552 is set to be divided into upper M bits and lower N bits, the number of character strings that can be registered in the character string register is (M+1)×(N+1).

In further another aspect, the first encoded data 1552 may be handled by being divided into three parts or more. As an example, when the first encoded data 1552 is set to be divided into upper K bits, middle M bits, and lower N bits, the number of character strings that can be registered in the character string register is (K+1)×(M+1)×(N+1).

Referring to FIG. 7, an example will be described in which entry data is stored in the TCAM device 210 by using the write data conversion circuit 230 according to the second embodiment. It is assumed that a rule in accordance with a regular expression of logical OR "USA|CHN| . . . |JPN" (100 three characters that represent a country name) is inputted into the character string extraction conversion circuit 710. The CPU 250 outputs a write command 726 of "1" to the character string register 720 and enables registration (writing) of bit data 712 to the character string register 720. At this time, a registration code 724 of "USA|CHN| . . . |JPN" to be registered in the character string register 720 is bit data representing "101", "102", "200" in binary numbers.

In this case, the first encode circuit 1550 converts a minimum value "101" and a maximum value "200" of the registration code into "0001111_00000000_00000000_00000000" and "1111111_11111111_11111111_11111111", respectively, as the first encoded data 1552. At this time, each first encoded data 1552 includes common bits "1111" in 25th to 28th bits.

The second encode circuit 760 compares one first encoded data 1552 with the other first encoded data 1552 for each bit and converts each mismatch bit among bits included in either one of the first encoded data 1552 into Don't Care "*". Thereby, the second encode circuit 760 generates "*1111_****_****_******" as the second encoded data 762 and outputs the second encoded data 762 to the selector circuit 770.

According to the above description, the write data conversion circuit 230 according to the second embodiment can represent a rule including a greater number of character strings as a small number of entry data without increasing the bit length of entry data to be stored in the TCAM device 210. As a result, the search system according to the second embodiment can further reduce the number of entries of TCAM used to store a rule.

Third Embodiment

The first and the second embodiments have a configuration in which a rule including a regular expression of logical OR is represented as one entry data. In a third embodiment, a configuration will be described in which a rule including a regular expression of repetition is represented as one entry data. A search system according to a third embodiment includes a write data conversion circuit 1600 and a search data conversion circuit 2200 instead of the write data conversion circuit 230 and the search data conversion circuit 240 according to the first embodiment. The other components are the same as those of the search system according to the first embodiment, so that repetitive description thereon will be omitted.

Figure 16:
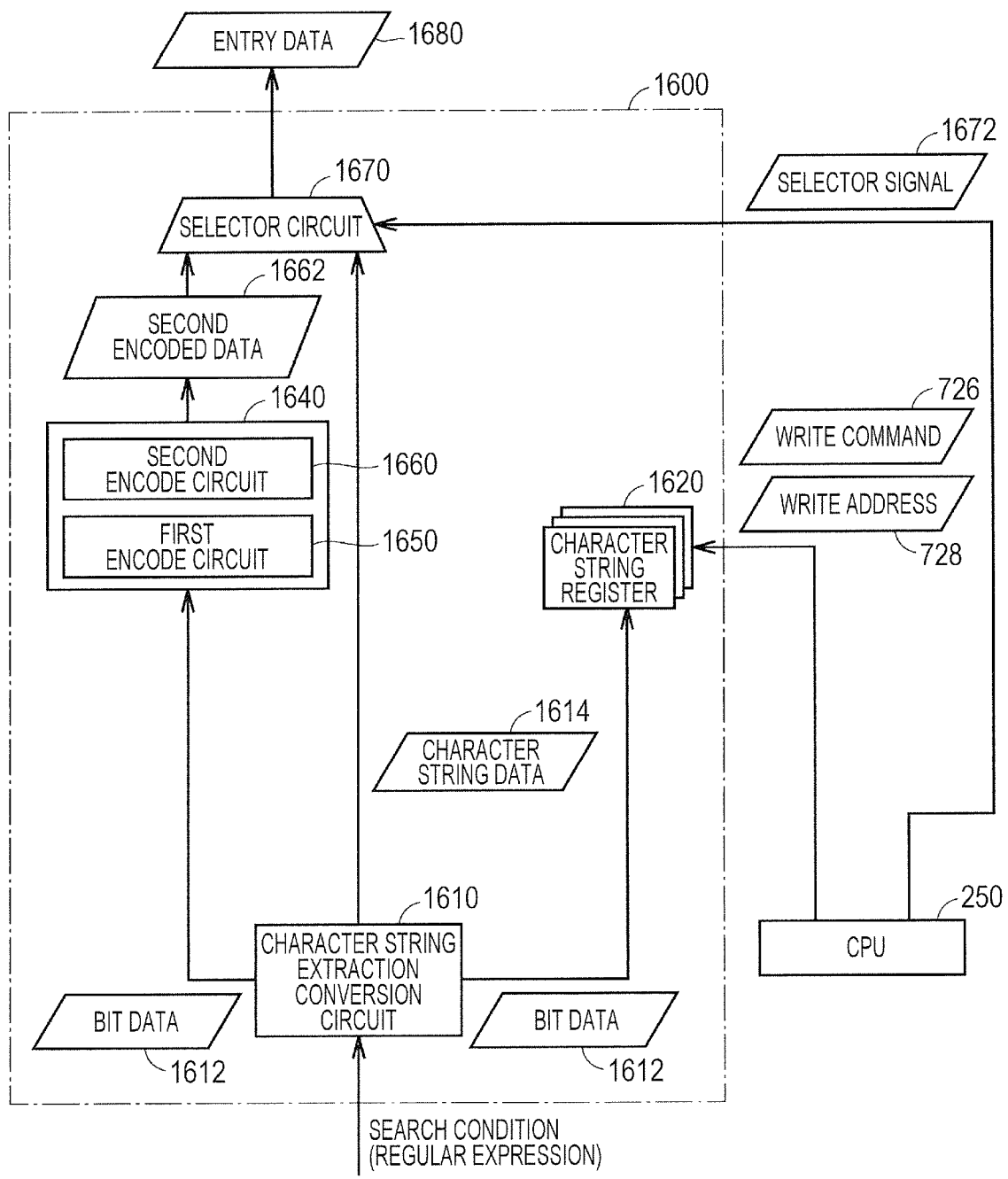
FIG. 16 is a diagram for explaining a configuration example of a write data conversion circuit according to a third embodiment.

FIG. 16 is a diagram for explaining a configuration example of the write data conversion circuit 1600 according to the third embodiment. The write data conversion circuit 1600 includes a character string extraction conversion circuit 1610, a character string register 1620, an encode circuit 1640, and a selector circuit 1670. The encode circuit 1640 includes a first encode circuit 1650 and a second encode circuit 1660. As an example, an operation of each device when a rule "A{2, 4}" including a regular expression of repetition is inputted into the character string extraction conversion circuit 1610 will be described with reference to FIGS. 17 to 21. In another aspect, "*", "+", and "?" may be used as a regular expression of repetition.

Figure 17:
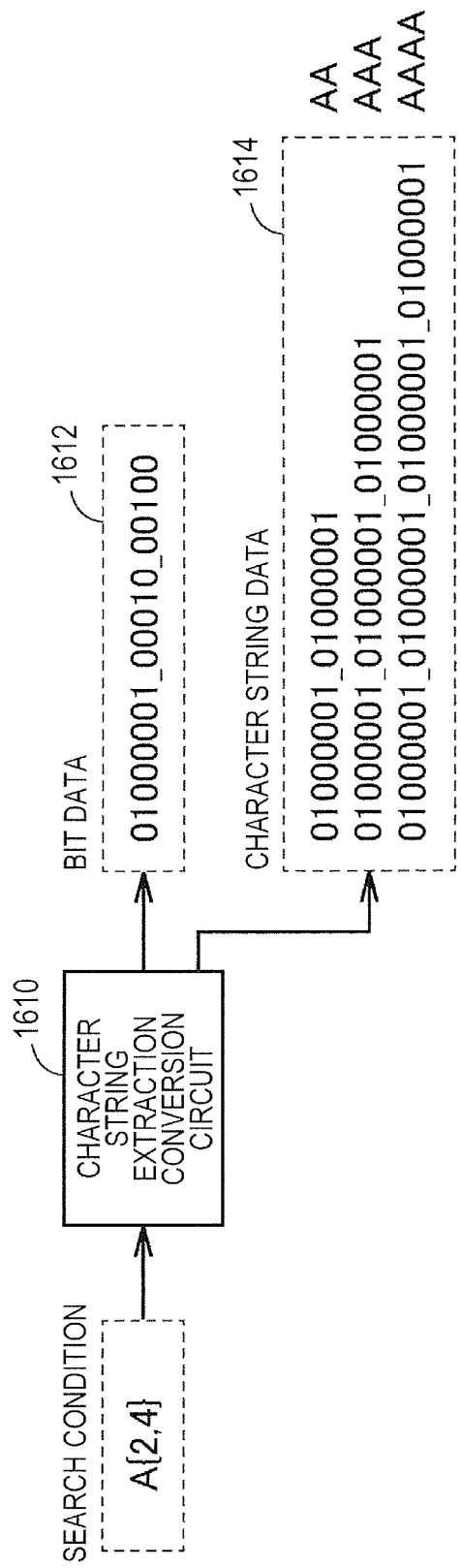
FIG. 17 is a diagram for explaining an operation of a character string extraction conversion circuit according to the third embodiment.

FIG. 17 is a diagram for explaining an operation of the character string extraction conversion circuit 1610 according to the third embodiment. Referring to FIGS. 16 and 17, the character string extraction conversion circuit 1610 outputs bit data 1612 to the character string register 1620 and the encode circuit 1640 based on an inputted rule (match condition) including a regular expression of repetition. Further, the character string extraction conversion circuit 1610 extracts a plurality of character strings from the inputted rule and outputs character string data 1614, which is obtained by converting the character strings, to the selector circuit 1670.

In the present example, the character string extraction conversion circuit 1610 converts the rule "A{2, 4}" into "01000001_00010_00100" as the bit data 1612. Upper eight bits are obtained by converting a character "A" to be repeated into an ASCII character code (binary number). Middle five bits are obtained by converting a lower limit value "2" of the number of repetition times. Lower five bits are obtained by converting an upper limit value "4" of the number of repetition times.

Further, the character string extraction conversion circuit 1610 extracts a plurality of character strings "AA", "AAA", and "AAAA" from the rule "A{2, 4}" based on a regular expression (repetition) included in the rule. The character string extraction conversion circuit 1610 converts these character strings into ASCII character codes (binary numbers), respectively, and generates the character string data 1614.

Figure 18:
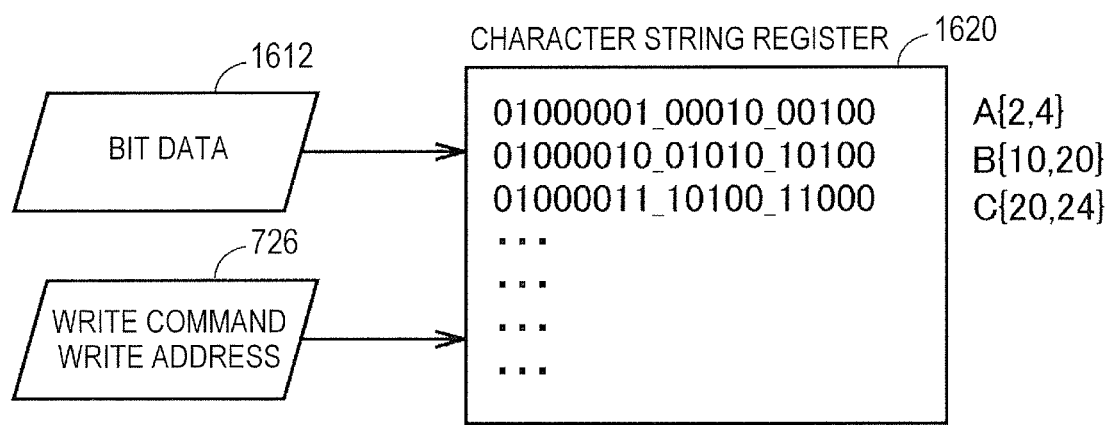
FIG. 18 is a diagram for explaining an operation of a character string register according to the third embodiment.

FIG. 18 is a diagram for explaining an operation of the character string register 1620 according to the third embodiment. Referring to FIGS. 16 and 18, the character string extraction conversion circuit 1610 stores the converted bit data 1612 into the character string register 1620. When the write command 726 inputted from the CPU is "1", the character string register 1620 stores the bit data 1612 according to the write address 728.

In an example shown in FIG. 18, the bit data 1612 corresponding to rules "A{2, 4}", "B{10, 20}", and "C{20, 24}" are stored in the character string register 1620.

FIG. 19 is a diagram for explaining an operation of a first encode circuit 1650 according to the third embodiment. Referring to FIG. 19, the first encode circuit 1650 generates two conversion bit data 1652 from the inputted bit data 1612. One conversion bit data 1652 includes bits (upper eight bits) representing a character to be repeated and bits (lower five bits) representing a lower limit value of the number of repetition times. The other conversion bit data 1652 includes bits (upper eight bits) representing a character to be repeated and bits (lower five bits) representing an upper limit value of the number of repetition times.

In the present example, based on bit data "01000001_00010_00100", the first encode circuit 1650 generates conversion bit data "01000001_00010" including the upper eight bits and the middle five bits and conversion bit data "01000001_00100" including the upper eight bits and the lower five bits and.

The first encode circuit 1650 converts the generated two conversion bit data 1652 into first encoded data, respectively. As an example, the first encoded data includes 31 bits. The upper eight bits of the first encoded data match the upper eight bits of the conversion bit data 1652. The upper eight bits of the two first encoded data function as common bits indicating a category (for example, repetition of character "A") common to a plurality of character strings extracted from a rule. The lower 23 bits of the first encoded data are generated so that "1" is sequentially set from the least significant bit according to the magnitude of a number (binary number) indicated by the lower five bits of the conversion bit data 1652. In other words, the lower 23 bits represent the number of repetition times.

In the present example, the first encode circuit 1650 generates the lower 23 bits of the first encoded data "0000000_00000000_00000001" from the lower five bits of the conversion bit data "00010" (2 in decimal number). Further, the first encode circuit 1650 generates the lower 23 bits of the first encoded data "0000000_00000000_00000111" from the lower five bits of the conversion bit data "00100" (4 in decimal number). The first encode circuit 1650 generates the first encoded data by adding the upper eight bits of the bit data 1612 to each of the generated data. In another aspect, the first encode circuit 1650 may encodes a registration code according to another encoding method (for example, one hot encoding). In further another aspect, the first encode circuit 1650 may directly generate two first encoded data from the inputted bit data 1612.

FIG. 20 is a diagram for explaining an operation of the second encode circuit 1660 according to the third embodiment. Referring to FIG. 20, the second encode circuit 1660 generates second encoded data 1662 based on two first encoded data 1654 inputted from the first encode circuit 1650. More specifically, the second encode circuit 1660 compares one first encoded data 1654 with the other first encoded data 1654 for each bit and generates the second encoded data 1662 in which each mismatch bit is converted into Don't Care "*". In other words, the lower 23 bits of the second encoded data represent a range of the number of repetition times. The second encode circuit 1660 outputs the generated second encoded data 1662 to the selector circuit 1670.

In the present example, the second encode circuit 1660 compares one first encoded data "01000001_0000000_00000000_00000001" with the other first encoded data "01000001_0000000_00000000_00000111" for each bit and generates "01000001_0000000_00000000_000001" in which the second and the third lowest bits, which are mismatch bits, are converted into Don't Care "".

Figure 21:
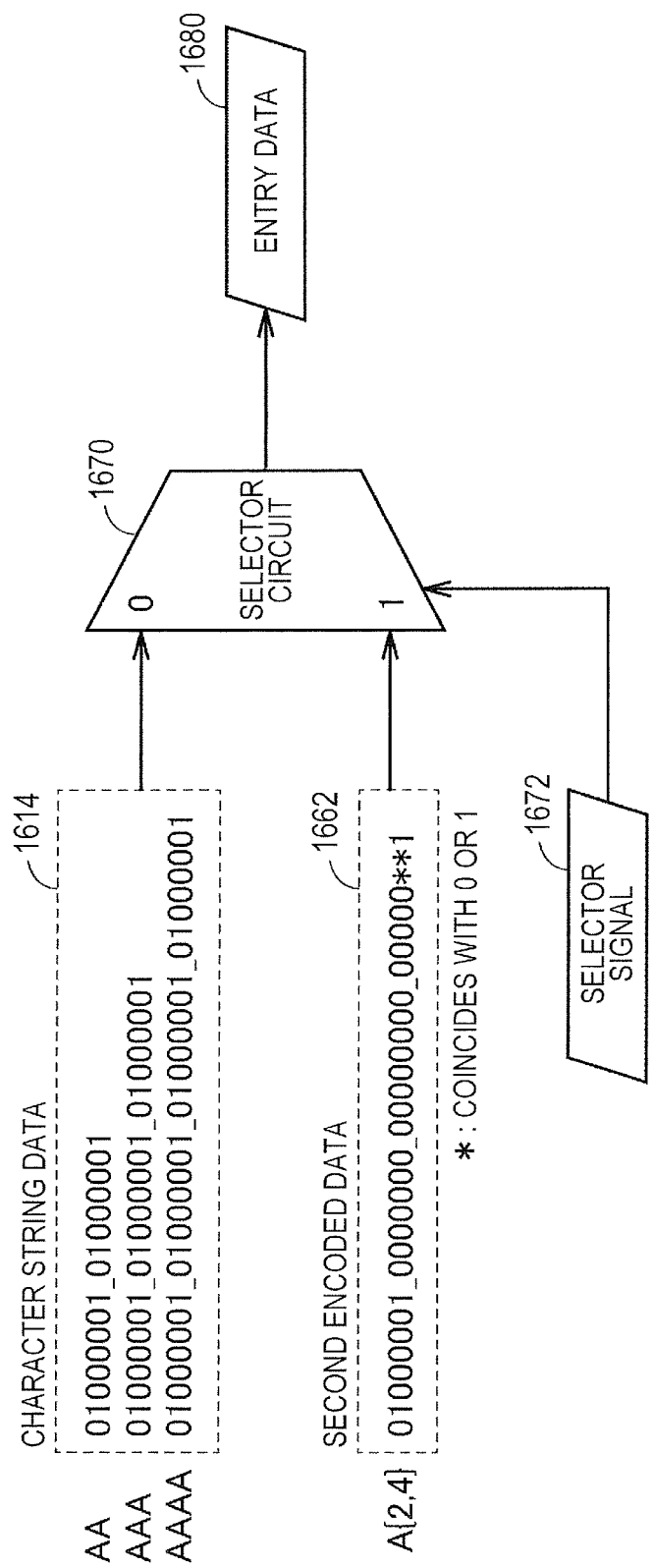
FIG. 21 is a diagram for explaining an operation of a selector circuit according to the third embodiment.

FIG. 21 is a diagram for explaining an operation of the selector circuit 1670 according to the third embodiment. Referring to FIGS. 16 and 21, the selector circuit 1670 selects data of either one of the character string data 1614 and the second encoded data 1662 according to a selector signal 1672 inputted from the CPU 250. The selector circuit 1670 outputs the selected data to the TCAM device 210 as entry data 1680. The TCAM device 210 stores the data into a TCAM cell.

According to the above description, the write data conversion circuit 1600 according to the third embodiment can reduce the number of entries of TCAM used to store a rule including a regular expression of repetition. Further, the write data conversion circuit 1600 generates two first encoded data, each of which include a portion where bits of "1" are set, the number of which corresponds to the lower limit value or the upper limit value of the number of repetition times. Thereby, the write data conversion circuit 1600 can generate the entry data 1680 (the second encoded data 1662) that includes all of the plurality of character strings included in a rule.

In addition, the write data conversion circuit 1600 is a circuit independent from the TCAM device 210, so that it is possible to use a generic TCAM as the TCAM device 210. Therefore, the search system can suppress the cost of TCAM.

Figure 22:
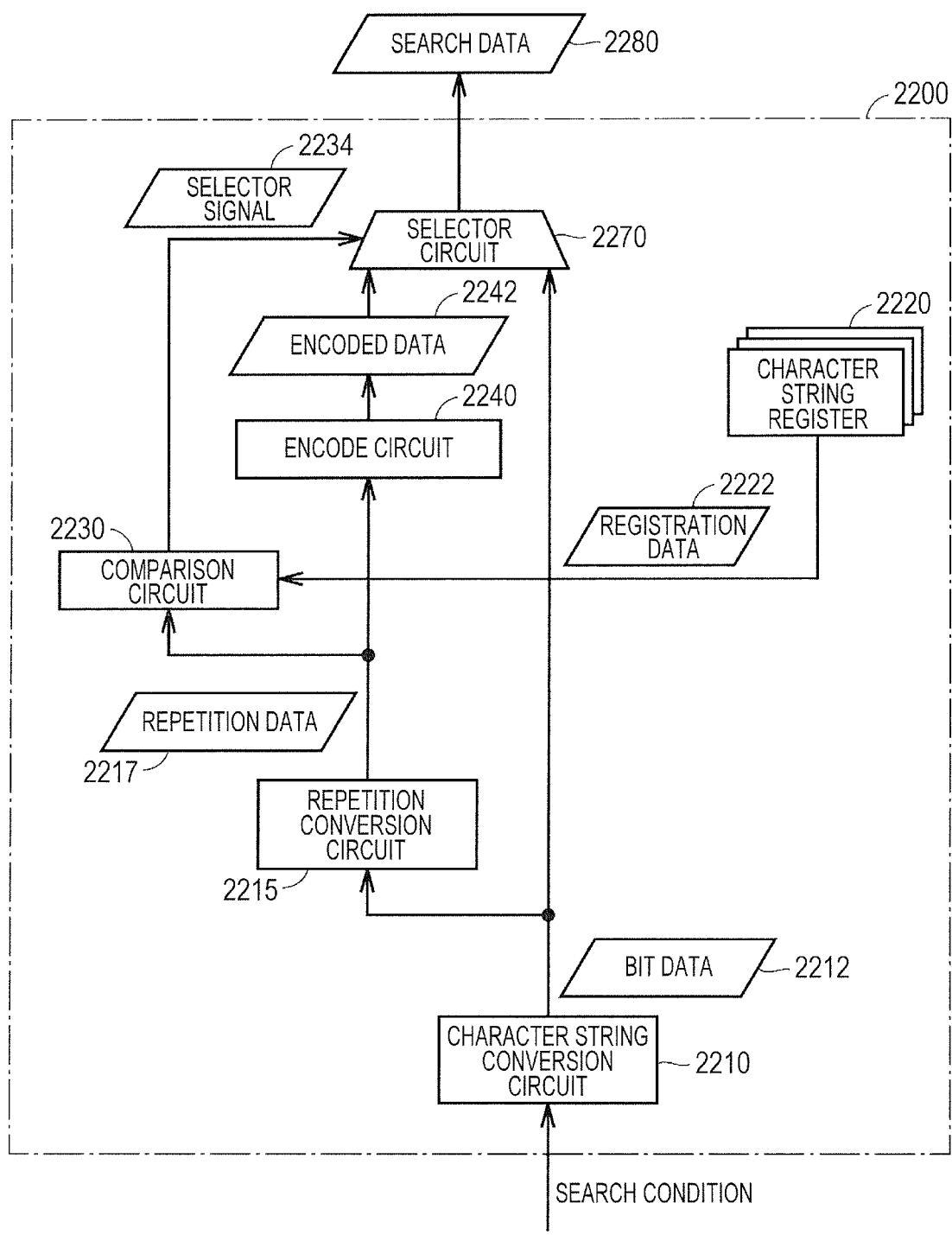
FIG. 22 is a diagram for explaining a configuration example of a search data conversion circuit according to the third embodiment.

FIG. 22 is a diagram for explaining a configuration example of the search data conversion circuit 2200 according to the third embodiment. The search data conversion circuit 2200 includes a character string conversion circuit 2210, a repetition conversion circuit 2215, a character string register 2220, a comparison circuit 2230, an encode circuit 2240, and a selector circuit 2270. As an example, an operation of each device when a character string "AAA" is inputted into the character string conversion circuit 2210 as a search condition will be described with reference to FIGS. 23 to 25.

Figure 23:
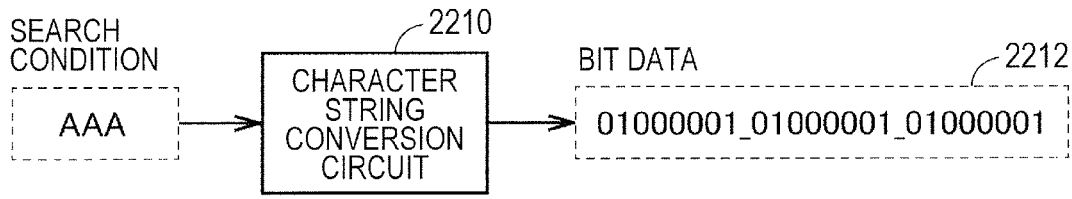
FIG. 23 is a diagram for explaining an operation of a character string conversion circuit according to the third embodiment.

FIG. 23 is a diagram for explaining an operation of the character string conversion circuit 2210 according to the third embodiment. Referring to FIGS. 22 and 23, the character string conversion circuit 2210 converts an inputted search condition (character string) into bit data 2212 and outputs the bit data 2212 to the repetition conversion circuit 2215 and the selector circuit 2270.

In the present example, when a character string "AAA" is inputted into the character string conversion circuit 2210 as a search condition, the character string conversion circuit 2210 converts the character string into ASCII character codes (binary numbers) and generates the bit data 2212.

Figure 24:
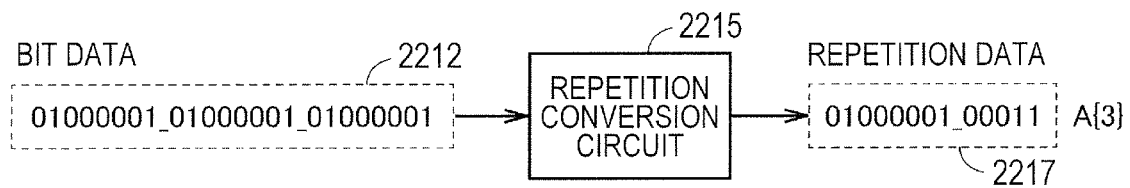
FIG. 24 is a diagram for explaining an operation of a repetition conversion circuit according to the third embodiment.

FIG. 24 is a diagram for explaining an operation of the repetition conversion circuit 2215 according to the third embodiment. The repetition conversion circuit 2215 according to the third embodiment converts the inputted bit data 2212 into repetition data 2217 and outputs the repetition data 2217 to the comparison circuit 2230 and the encode circuit 2240.

More specifically, the repetition conversion circuit 2215 detects repetition of character code from the bit data 2212 and converts the bit data 2212 into the repetition data 2217 representing the character code and the number of repetition times.

In the present example, the repetition conversion circuit 2215 detects that a character code "01000001" of "A" is repeated three times in bit data "01000001_01000001_01000001". According to the detection result, the repetition conversion circuit 2215 generates repetition data "01000001_00011" indicating a character code of "A" by the upper eight bits and the number of repetition times "3" by the lower five bits.

Referring to FIG. 22 again, the character string register 2220 will be described. The character string register 2220 holds registration data 2222. The registration data 2222 is the same data as data stored in the character string register 1620. In anther aspect, the character string register 1620 and the character string register 2220 may be the same register.

Figure 25:
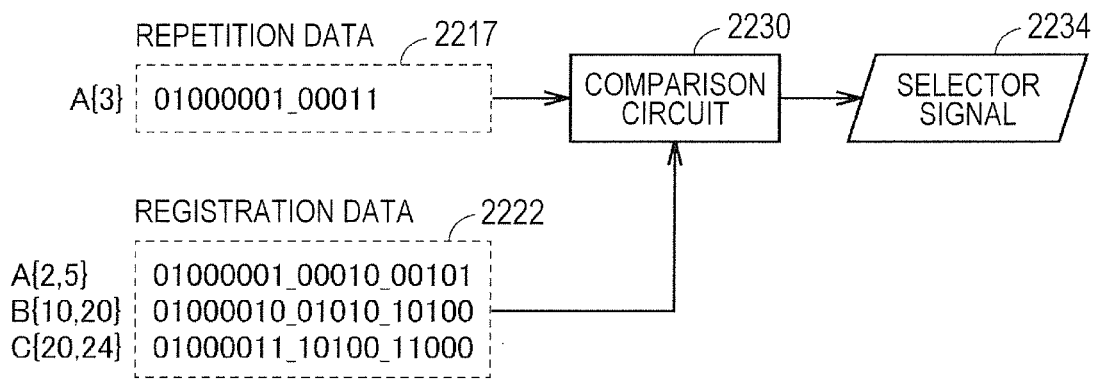
FIG. 25 is a diagram for explaining an operation of a comparison circuit according to the third embodiment.

FIG. 25 is a diagram for explaining an operation of the comparison circuit 2230 according to the third embodiment. Referring to FIGS. 22 and 25, the comparison circuit 2230 compares the inputted repetition data 2217 with a plurality of registration data 2222 stored in the character string register 2220. The comparison circuit 2230 determines whether or not the repetition data 2217 is included in any one of the plurality of registration data 2222.

More specifically, the comparison circuit 2230 compares the upper eight bits of the repetition data 2217 and the upper eight bits of the plurality of registration data 2222 and extracts matched registration data 2222. Next, the comparison circuit 2230 determines whether or not a number represented by the lower five bits of the repetition data 2217 is included in a range from a number represented by the middle five bits of the matched registration data 2222 to a number represented by the lower five bits of the matched registration data 2222. When the comparison circuit 2230 determines that the number represented by the lower five bits of the repetition data 2217 is included in the range described above, the comparison circuit 2230 determines that the repetition data 2217 is included in the registration data 2222. The comparison circuit 2230 outputs a selector signal 2234 indicating whether or not the repetition data 2217 is included in the registration data 2222 to the selector circuit 2270.

In an example shown in FIG. 25, it is assumed that the bit data 1612 representing rules "A{2, 4}", "B{10, 20}", and "C{20, 24}" is stored in the character string register 2220 as the registration data 2222. In this condition, the comparison circuit 2230 determines that the repetition data 2217 where "A{3}" is repeated is included in the registration data 2222 representing the rule "A{2, 4}".

Referring to FIG. 22 again, the encode circuit 2240 converts the repetition data 2217 into encoded data 2242 according to the same method as an encode method by which the first encode circuit 1650 converts the conversion bit data 1652 into the first encoded data.

In the present example, the encode circuit 2240 converts repetition data "010000001_00011" representing "A{3}" into "01000001_0000000_00000000_00000011" and outputs the converted data to the selector circuit 2270 as the encoded data 2242.

The selector circuit 2270 outputs the encoded data 2242 to the TCAM device 210 as search data 2280 in response to reception of the selector signal 2234 indicating that the repetition data 2217 is included in the registration data 2222 from the comparison circuit 2230. On the other hand, in response to reception of the selector signal 2234 indicating that the repetition data 2217 is not included in the registration data 2222, the selector circuit 2270 outputs the bit data 2212 to the TCAM device 210 as search data 2280. The TCAM device 210 determines whether or not the search data 2280 (search key) hits any one of the stored entry data.

In the present example, the search data conversion circuit 2200 outputs search data "01000001_0000000_00000000_00000011" to the TCAM device 210. The TCAM device 210 stores entry data "01000001_0000000_00000000_0000***1" corresponding to the rule "A{2, 4}". Therefore, the TCAM device 210 outputs information indicating that the inputted search data is hit and information of an address where the entry data is stored to the CPU 250 as a search result.

According to the above description, the search system according to the third embodiment converts a rule including a regular expression of repetition into entry data including bits representing a character to be repeated and bits representing a range of the number of repetition times and stores the entry data into a TCAM cell. Further, the search system converts a character string inputted as a search condition into search data including bits representing a repeated character and bits representing the number of repetition times. Thereby, the search system according to the third embodiment can determine whether or not a search condition represented by repetition of a character hits the rule described above by using a small number of entries.

Fourth Embodiment

The first encode circuit 1650 of the third embodiment has a configuration to handle the lower 23 bits of the 31-bit first encoded data 1652 as bit data representing the number of repetition times and sequentially set "1" from the least significant bit according to the number of repetition times. In the case of such a configuration, the first encode circuit 1650 can represent the number of repetition times only up to 24 (=23+1) times.

Therefore, a search system according to a fourth embodiment increases the number of repetition times that can be represented without changing the bit length of the first encoded data as compared with the search system according to the third embodiment. Hereinafter a configuration of the search system according to the fourth embodiment will be described. Since the configuration of the search system according to the fourth embodiment is substantially the same as the search system according to the third embodiment, only differences between them will be described.

Figure 26:
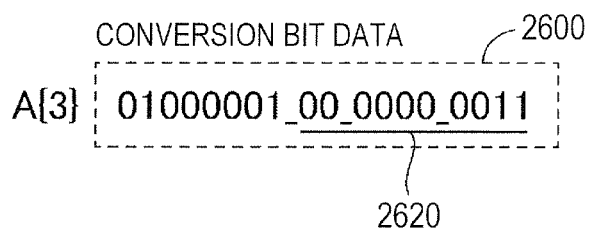
FIG. 26 is a diagram for explaining a data structure of bit data representing the number of repetition times according to a fourth embodiment.

FIG. 26 is a diagram for explaining a data structure of bit data representing the number of repetition times according to a fourth embodiment. As an example, the data structure will be described by using conversion bit data 2600 according to the fourth embodiment. In the third embodiment, the bit length of the conversion bit data 1652 is 13 bits and the lower five bits represent the number of repetition times. On the other hand, the conversion bit data according to the fourth embodiment is 18 bits and the lower ten bits represent the number of repetition times. The lower ten bits are defined as repetition frequency data 2620.

In the fourth embodiment, the middle five bits and the lower five bits of the bit data 1612, and the lower five bits of the conversion bit data 1652, which represent the number of repetition times in the third embodiment, are represented by ten bits.

Figure 27:
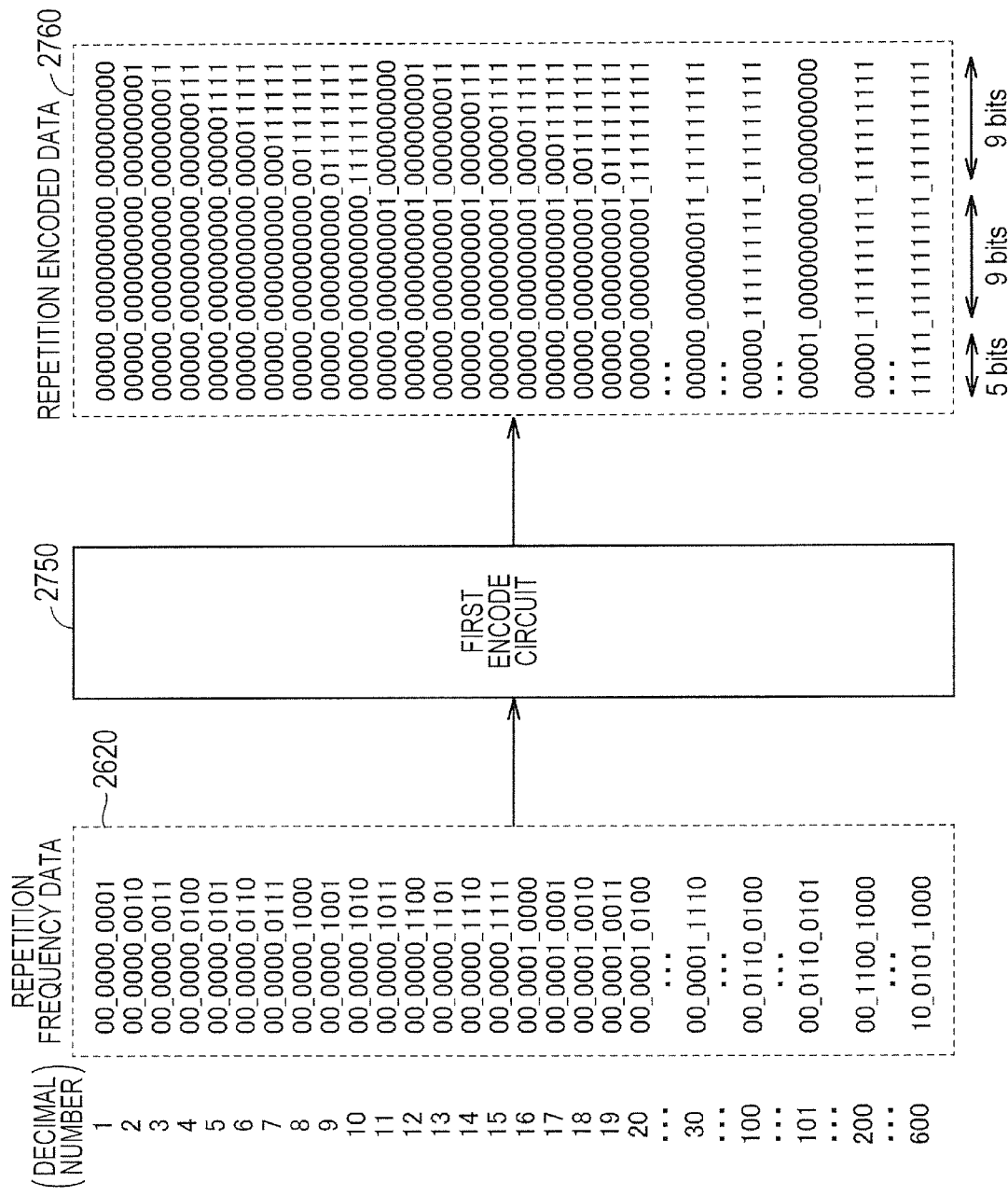
FIG. 27 is a diagram for explaining an operation of a first encode circuit according to the fourth embodiment.

FIG. 27 is a diagram for explaining an operation of a first encode circuit 2750 according to the fourth embodiment. The search system according to the fourth embodiment includes the first encode circuit 2750 instead of the first encode circuit 1650.

As an example, the first encode circuit 2750 converts the repetition frequency data 2620 included in the conversion bit data 2600 into 23-bit repetition encoded data 2760. The first encode circuit 2750 merges the upper eight bits of the conversion bit data 2600 and the repetition encoded data 2760 to form first encoded data and outputs the first encoded data to the second encode circuit 1660. The repetition encoded data 2760 is set by being divided into higher five bits, middle nine bits, and, lower nine bits in the same manner as the first encoded data 1552 according to the second embodiment. The middle nine bits function as carry bits when all the lower nine bits become "1". The higher five bits function as carry bits when all the middle nine bits become "1".

The above operation will be described using a specific example. The repetition frequency data "00_0000_0010" representing the number of repetition times "2" is converted into "00000_000000000_000000001". The repetition frequency data "00_0000_1010" representing the number of repetition times "10" is converted into "00000_000000000_111111111". The repetition frequency data "00_0000_1011" representing the number of repetition times "11" is converted into "00000_000000001_000000000" because a carry is produced in the least significant bit of the middle nine bits.

The repetition frequency data "00_0110_0100" representing the number of repetition times "100" is converted into "00000_111111111_111111111". The repetition frequency data "00_0110_0101" representing the number of repetition times "101" is converted into "00001_000000000_000000000" because a carry is produced in the least significant bit of the higher five bits.

When the 23-bit repetition encoded data is set by being divided into the higher five bits, the middle nine bits, and, the lower nine bits in this way, it is possible to express the number of repetition times of 600 (=(5+1)×(9+1)×(9+1)) patterns. Therefore, the search system according to the fourth embodiment can increase the number of repetition times that can be handled to be greater than that of the search system according to the third embodiment without increasing the bit length of the first encoded data.

Fifth Embodiment

The first and the second embodiments have a configuration in which a rule in accordance with a regular expression of logical OR is stored in the TCAM device by using a small number of entries and the third and the fourth embodiments have a configuration in which a rule in accordance with a regular expression of repetition is stored in the TCAM device by using a small number of entries.

A search system according to a fifth embodiment store both the rule in accordance with a regular expression of logical OR and the rule in accordance with a regular expression of repetition into the TCAM device by using a small number of entries. Hereinafter, a configuration of the search system according to the fifth embodiment will be described.

Figure 28:
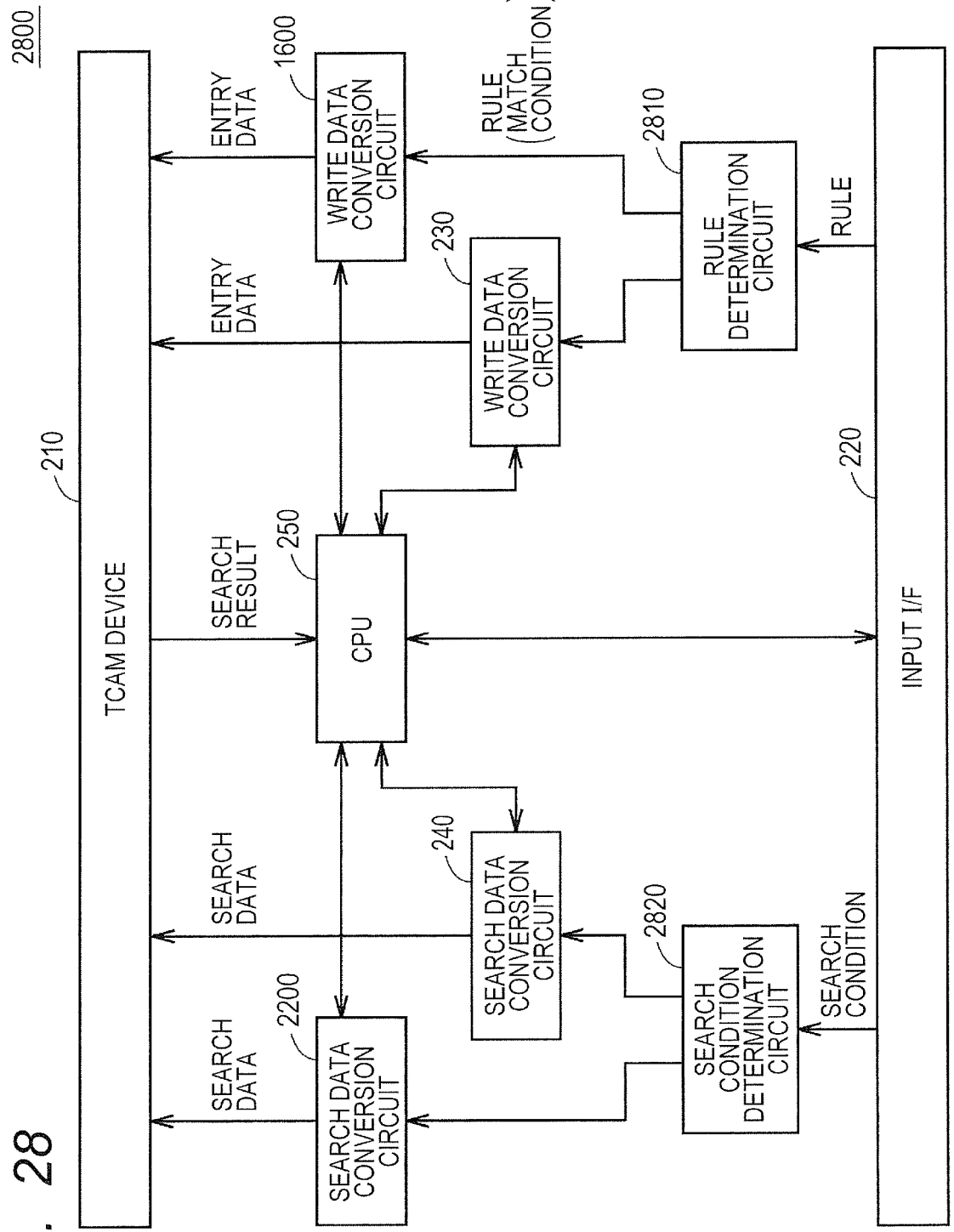
FIG. 28 is a diagram for explaining a configuration example of a search system according to a fifth embodiment.

FIG. 28 is a diagram for explaining a configuration example of a search system 2800 according to the fifth embodiment. The components denoted by the same reference numerals as those of the search system 200 shown in FIG. 2 are substantially the same as those of the search system 200 shown in FIG. 2, and therefore only differences between the search systems 200 and 2800 will be described.

The search system 2800 includes the write data conversion circuits 230 and 1600 and the search data conversion circuits 240 and 2200. The search system 2800 further includes a rule determination circuit 2810 and a search condition determination circuit 2820.

The rule determination circuit 2810 determines a type of a regular expression included in an inputted rule and outputs the rule to either one of the write data conversion circuits 230 and 1600. More specifically, when a rule including a regular expression of logical OR is inputted into the rule determination circuit 2810, the rule determination circuit 2810 outputs the rule to the write data conversion circuit 230. When a rule including a regular expression of repetition is inputted into the rule determination circuit 2810, the rule determination circuit 2810 outputs the rule to the write data conversion circuit 1600.

The write data conversion circuits 230 and 1600 according to the fifth embodiment basically operate as described in FIGS. 7 and 16, respectively. However, data (third encoded data) outputted from the second encode circuit 760 (1660) is slightly different from data described above (the second encoded data 762 and 1662).

FIG. 29 are a diagram for explaining data structures of third encoded data 2910 (2915) and fourth encoded data 2930 (2935) according to the fifth embodiment. The FIG. 29A is a diagram for explaining the data structure of the third encoded data 2910 (2915) outputted by the second encode circuit 760 (1660) according to the fifth embodiment.

First, the third encoded data 2910 outputted by the second encode circuit 760 will be described with reference to the FIG. 29A. The third encoded data 2910 includes a classification code 2920 and the second encoded data 762 described above. The classification code 2920 is data indicating a type of regular expression included in a rule. As an example, the second encode circuit 760 according to the fifth embodiment indicates that the third encoded data 2910 is a rule in accordance with a regular expression of logical OR by setting the classification code 2920 to "1".

The second encode circuit 1660 according to the fifth embodiment outputs the third encoded data 2915 including the classification code 2920 and the second encoded data 1662 described above. At this time, the second encode circuit 1660 indicates that the third encoded data 2915 is a rule in accordance with a regular expression of repetition by setting the classification code 2920 to "0".

Thereby, a rule in accordance with a regular expression of logical OR and a rule in accordance with a regular expression of repetition are stored as distinguished from each other in the TCAM device.

Referring to FIG. 28 again, the search condition determination circuit 2820 outputs an inputted character string to either one of the search data conversion circuits 240 and 2200 according to the inputted character string used as a search condition. As an example, when the inputted character string is a repetitive character string (for example, "AA", "AAA", and the like), the search condition determination circuit 2820 outputs the character string to the search data conversion circuit 2200. On the other hand, when the inputted character string is a character string of logical OR, the search condition determination circuit 2820 outputs the inputted character string to the search data conversion circuit 240.

Each of the search data conversion circuits 240 and 2200 according to the fifth embodiment basically operates as described in FIGS. 14 and 22. However, data (the fourth encoded data) outputted by the encode circuit 1440 (2240) is slightly different from the encoded data 1442 (2242) described above.

First, the fourth encoded data 2930 outputted by the encode circuit 1440 according to the fifth embodiment will be described with reference to a FIG. 29B. The encode circuit 1440 outputs the fourth encoded data 2930 including a classification code 2940 and the encoded data 1442 described above. At this time, the encode circuit 1440 indicates that the fourth encoded data 2930 is search data (search key) of logical OR by setting the classification code 2940 to "1".

The encode circuit 2240 according to the fifth embodiment outputs the fourth encoded data 2935 including the classification code 2940 and the encoded data 2242 described above. At this time, the encode circuit 2240 indicates that the fourth encoded data 2935 is search data (search key) of repetition by setting the classification code 2940 to "0".

According to the above description, the search system 2800 according to the fifth embodiment can store a rule in accordance with a regular expression of logical OR and a rule in accordance with a regular expression of repetition into the same TCAM cell array by using a small number of entries. Thereby, the search system 2800 can further reduce the number of TCAM cell arrays (the number of entries) of the TCAM device 210 and the number of fans (not shown in the drawings) for cooling the TCAM cells. As a result, the present technique can further reduce the cost of the search system.

Further, the search system 2800 generates entry data and search data so that the entry data and the search data include a classification code that indicates a type of regular expression. Thereby, the search system 2800 can determine whether or not a character string included in a search condition hits the rules described above in the same TCAM cell array by using a small number of entries.

Sixth Embodiment

The search systems according to the first to the fifth embodiments have a configuration in which search is performed by using the TCAM device. A search system 3000 according to the sixth embodiment performs search by further using a search engine in addition to the TCAM device.

Figure 30:
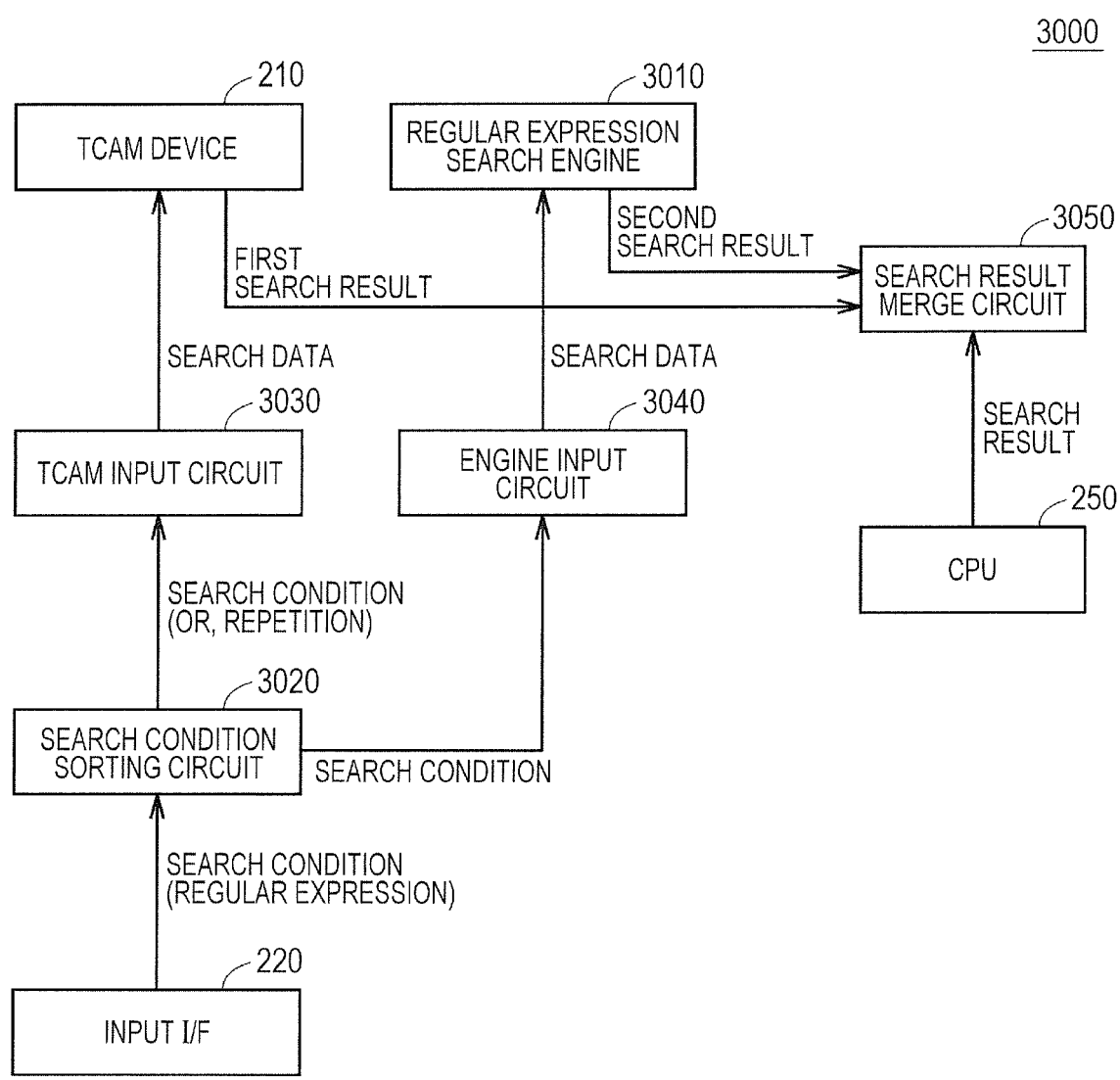
FIG. 30 is a diagram for explaining a configuration example of a search system according to a sixth embodiment.

FIG. 30 is a diagram for explaining a configuration example of the search system 3000 according to the sixth embodiment. The components denoted by the same reference numerals as those in FIG. 2 are the same as the components in FIG. 2, and therefore these components will not be described again.

Referring to FIG. 30, the search system 3000 further includes a regular expression search engine 3010 in addition to the TCAM device 210. The search system 3000 further includes a search condition sorting circuit 3020, a TCAM input circuit 3030, an engine input circuit 3040, and a search result merge circuit 3050.

In the TCAM device 210 according to the sixth embodiment, a rule in accordance with a regular expression of logical OR and a rule in accordance with a regular expression of repetition are stored in each entry according to the method described in the fifth embodiment.

The regular expression search engine 3010 is a program for interpreting a grammar of an inputted regular expression and performing pattern matching processing. The regular expression search engine 3010 is a known search engine and may be, for example, a non-deterministic finite automaton (NFA) type engine or a deterministic finite automaton (DFA) type engine.

The search condition sorting circuit 3020 outputs a search condition to either one of the TCAM input circuit 3030 and the engine input circuit 3040 according to a type of regular expression included in the search condition. More specifically, the search condition sorting circuit 3020 outputs a search condition in accordance with a regular expression of logical OR and a search condition in accordance with a regular expression of repetition to the TCAM input circuit 3030. The search condition sorting circuit 3020 outputs a search condition in accordance with a regular expression other than the above regular expressions to the engine input circuit 3040.

The TCAM input circuit 3030 includes the search condition determination circuit 2820 described in the fifth embodiment and the search data conversion circuits 240 and 2200. The TCAM input circuit 3030 converts an inputted (character string that indicates) search condition into search data including a classification code indicating a type of regular expression and outputs the search data to the TCAM device 210. Thereby, the TCAM device 210 outputs a first search result indicating whether or not the character string included in the search condition hits a stored rule to the search result merge circuit 3050. In another aspect, the first search result may include an address of an entry hit in the TCAM device 210.

On the other hand, the engine input circuit 3040 converts an inputted (character string that indicates) search condition into a data format which can be searched for by the regular expression search engine 3010 and outputs the converted search condition to the regular expression search engine 3010. The regular expression search engine 3010 outputs a second search result indicating a search result for search data (search key) inputted from the engine input circuit 3040 to the search result merge circuit 3050.

The search result merge circuit 3050 integrates (merges) the inputted first and second search results and outputs the integrated search results to the CPU 250 as a search result.

According to the above description, the search system 3000 according to the sixth embodiment can reduce processing load of searching by using the regular expression search engine 3010 in addition to the TCAM device 210. Further, in general, the search processing performed by the TCAM device 210, which is hardware, is faster than the search processing performed by the regular expression search engine 3010, which is software. Therefore, the search system 3000 can realize search processing faster than when only the regular expression search engine 3010 is used.

Memory where the entry data is stored is not limited to the TCAM cell. Specifically, the entry data can be stored in an associative memory cell that can hold three or more values.

The various circuits described above can be realized by a circuit including at least one semiconductor integrated circuit such as a processor, at least one ASIC (Application Specific Integrated Circuit), at least one DSP (Digital Signal Processor), at least one FPGA (Field Programmable Gate Array), and/or a circuit having other calculation functions. These circuits can realize various functions described above by reading one or more instructions from at least one tangible readable medium.

Such a medium may be a magnetic medium (for example, hard disk), an optical medium (for example, compact disk (CD) and DVD), and any type of memory such as a volatile memory and a non-volatile memory, but is not limited to these media.

The volatile memory may include DRAM (Dynamic Random Access Memory) and SRAM (Static Random Access Memory). The non-volatile memory may include ROM and NVRAM. A semiconductor memory and at least one processor may be a part of a semiconductor circuit.

While the invention made by the inventors has been specifically described based on the embodiments, it is needless to say that the invention is not limited to the embodiments and may be variously modified without departing from the scope of the invention.

What is claimed is:

1. A data conversion device for generating entry data which is to be compared with a search key and is stored in an associative memory that can hold three or more values, the data conversion device comprising:
    a conversion circuit for extracting a plurality of character strings from an inputted rule in accordance with a regular expression on the basis of the regular expression and converting first and second character strings included in the character strings, respectively, into first and second bit data different from each other; and
    an encode circuit that compares the first bit data and the second bit data for each bit and generates entry data in which each mismatch bit among a plurality of bits included in the first bit data is converted into a "Don't Care" value on the basis of a comparison result.

2. The data conversion device according to claim 1, wherein the conversion circuit converts the first and the second character strings into the first and the second bit data respectively so that the first and the second bit data include bit data indicating a category in common with the character strings.

3. The data conversion device according to claim 1, wherein the rule includes a regular expression of logical OR.

4. The data conversion device according to claim 3, wherein the conversion circuit
    converts each of the character strings into a continuous number registration code, and
    converts a minimum registration code corresponding to the first character string and a maximum registration code corresponding to the second character string into first and second bit data respectively according to a number of the registration code.

5. The data conversion device according to claim 1, wherein the rule includes a regular expression of repetition of a character.

6. The data conversion device according to claim 1, wherein the conversion circuit generates the first and the second bit data according to a type of regular expression included in the rule.

7. The data conversion device according to claim 1, wherein the encode circuit generates entry data so that the entry data includes third bit data indicating a type of regular expression included in the rule.

8. The data conversion device according to claim 1, further comprising:
    a storage device for storing a plurality of character strings; and
    a comparison circuit for determining whether or not each of the extracted character strings matches any one of the character strings stored in the storage device,
    wherein the comparison circuit
    outputs the extracted character strings to the conversion circuit when determining that each of the extracted character strings matches any one of the character strings stored in the storage device, and
    outputs the extracted character strings to the associative memory as the entry data when determining that each of the extracted character strings does not match any one of the character strings stored in the storage device.

9. A search system comprising:
    a search device having an associative memory that can hold three or more values;
    a data conversion device for generating entry data which is to be compared with a search key and is stored in the associative memory; and
    a search data conversion device for converting an inputted search condition into a search key and outputting the search key to the search device,
    wherein the data conversion device includes
    a conversion circuit for extracting a plurality of character strings from an inputted rule in accordance with a regular expression on the basis of the regular expression and converting first and second character strings included in the character strings, respectively, into first and second bit data different from each other, and
    an encode circuit that compares the first bit data and the second bit data for each bit and generates entry data in which each mismatch bit among a plurality of bits included in the first bit data is converted into a "Don't Care" value on the basis of a comparison result.

10. The search system according to claim 9, wherein the conversion circuit generates the first and the second bit data according to a predetermined condition, and
    wherein the search data conversion device converts a character string included in an inputted search condition into the search key according to the predetermined condition and outputs the search key to the search device.

11. The search system according to claim 9, further comprising:
- a search engine configured to be able to perform search based on a search condition in accordance with a regular expression; and
- a switching device for outputting a plurality of character strings included in the search condition to either one of the search data conversion device and the search engine according to a type of regular expression included in an inputted search condition.

12. A method for generating entry data which is to be compared with a search key and is stored in an associative memory that can hold three or more values, the method comprising the steps of:
- extracting a plurality of character strings from an inputted rule in accordance with a regular expression on the basis of the regular expression;
- converting first and second character strings included in the character strings, respectively, into first and second bit data different from each other; and
- comparing the first bit data and the second bit data for each bit and generating entry data in which each mismatch bit among a plurality of bits included in the first bit data is converted into a "Don't Care" value on the basis of a comparison result.

* * * * *